United States Patent
Ho

(10) Patent No.: US 6,747,959 B1
(45) Date of Patent: Jun. 8, 2004

(54) VOICE DATA INTEGRATED MULITACCESS BY SELF-RESERVATION AND BLOCKED BINARY TREE RESOLUTION

(75) Inventor: Jin-Meng Ho, Parsippany, NJ (US)

(73) Assignee: AT&T Corp., New York, NY (US)

( * ) Notice: Subject to any disclaimer, the term of this patent is extended or adjusted under 35 U.S.C. 154(b) by 810 days.

(21) Appl. No.: 09/596,712

(22) Filed: Jun. 19, 2000

Related U.S. Application Data

(63) Continuation-in-part of application No. 09/222,879, filed on Dec. 30, 1998, and a continuation-in-part of application No. 09/222,878, filed on Dec. 30, 1998.
(60) Provisional application No. 60/103,370, filed on Oct. 7, 1998, now abandoned.

(51) Int. Cl.[7] .............................. H04B 1/44; H04L 12/43
(52) U.S. Cl. ...................... 370/282; 370/443; 370/461
(58) Field of Search ................................ 370/276–282, 370/310, 329, 330, 335–38, 341–350, 431, 436, 437–439, 441–443, 445, 447, 458, 459, 461, 462

(56) References Cited

U.S. PATENT DOCUMENTS

| | | | | |
|---|---|---|---|---|
| 5,012,469 A | * | 4/1991 | Sardana | 370/322 |
| 5,949,768 A | * | 9/1999 | Citta et al. | 370/322 |
| 5,960,000 A | * | 9/1999 | Ruszczyk et al. | 370/447 |
| 5,978,382 A | * | 11/1999 | Citta et al. | 370/443 |
| 6,034,967 A | * | 3/2000 | Citta et al. | 370/443 |
| 6,356,555 B1 | * | 3/2002 | Rakib et al. | 370/441 |
| 6,370,153 B1 | * | 4/2002 | Eng | 370/438 |
| 6,377,548 B1 | * | 4/2002 | Chuah | 370/233 |
| 6,469,991 B1 | * | 10/2002 | Chuah | 370/329 |
| 6,567,416 B1 | * | 5/2003 | Chuah | 370/418 |

* cited by examiner

Primary Examiner—David Vincent
(74) Attorney, Agent, or Firm—Michael Haynes PLC

(57) ABSTRACT

A multiple access communication protocol includes an uplink channel and a downlink channel is disclosed. The uplink channel has a plurality of frames, such that each frame has a first selectable number of minislots and a second selectable number of slots. A reservation request of a first type is sent into a first selected minislot of a selected frame of the uplink channel when information of a first type is to be sent. The reservation request of the first type requests an assignment for at least one slot for transmitting information of the first type in at least one frame that is subsequent to the selected frame. A reservation request of the second type is sent into a second selected minislot of the selected frame when the second selected minislot is available in the selected frame and when information of a second type is to be sent. The reservation request of the second type requests an assignment of at least one slot for transmitting information of the second type in at least one frame that is subsequent to the selected frame, and contends for the second selected minislot based on a blocked binary tree algorithm. The downlink channel contains a feedback message that occurs prior to the end of the selected frame of the uplink channel. The feedback message includes minislot assignment information for sending reservation requests of the first and the second type and slot assignment information for transmitting information of the first and the second type, minislot contention information for the reservation requests of the second type sent in the selected frame, and allocation time information for the reservation requests of the second type to be initiated in a frame after the selected frame on behalf of the information of the second type.

81 Claims, 15 Drawing Sheets

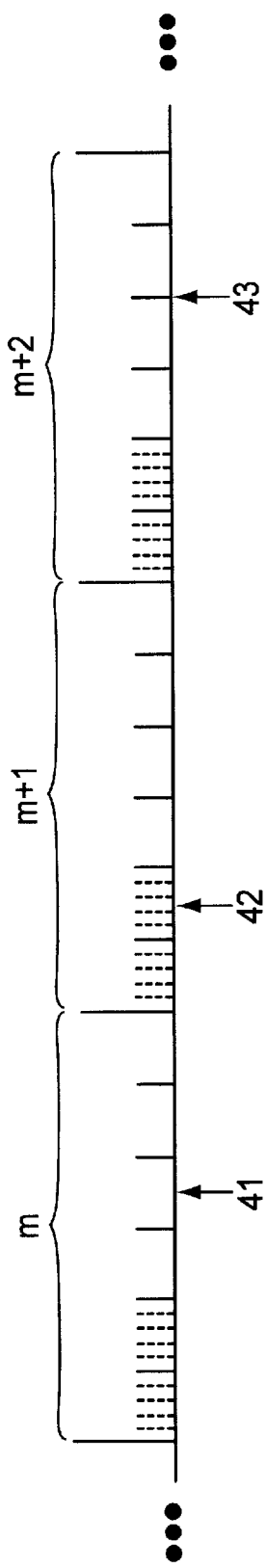
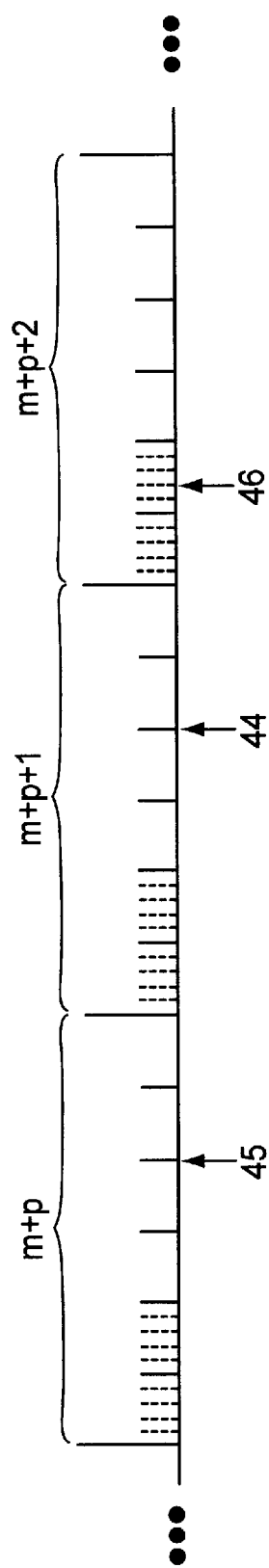
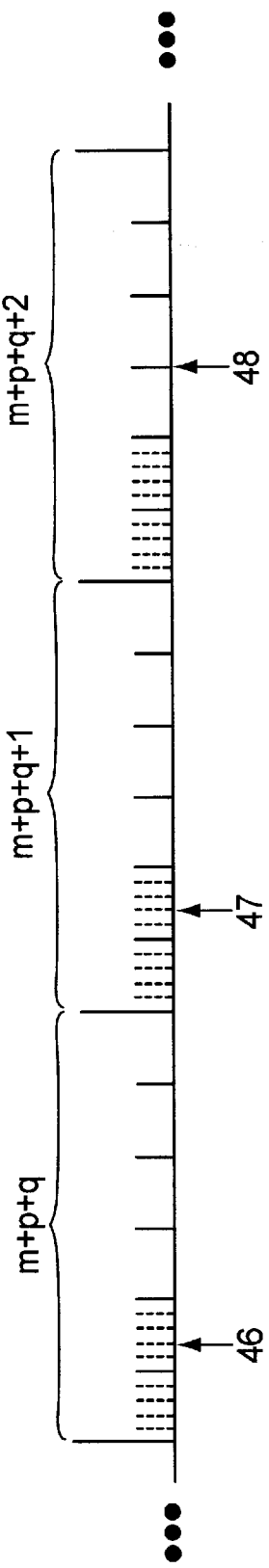

US 6,747,959 B1

VOICE DATA INTEGRATED MULITACCESS BY SELF-RESERVATION AND BLOCKED BINARY TREE RESOLUTION

BACKGROUND OF THE INVENTION

The present application is related to application Serial No. 09/597,392, entitled Voice-Data Integrated Multiaccess By Self-Reservation and Stabilized Aloha Contention, invented by J. -M. Ho, and filed concurrently with the present application; and is a continuation-in-part patent application of patent application Ser. No.09/222,879, entitled Multimedia Packet Multiple Access To High-Speed Local-Loop Broadcast Channels: Algorithm Design, invented by J. -M. Ho, and filed Dec. 30, 1998; a continuation-in-part patent application of patent application Ser. No. 09/222,878, entitled "Multimedia Packet Multiple Access To High-Speed Local-Loop Broadcast Channels: Protocol Architecture, invented by J. -M. Ho, and filed Dec. 30, 1998, each of which is related to Provisional patent application 60/103,370, filed Oct. 7, 1998, now expired; each of which is incorporated by reference herein.

BACKGROUND OF THE INVENTION

1. Field of the Invention

The present invention relates to the fields of telecommunications and computing. More particularly, the present invention relates to a protocol for voice-data integrated multiaccess to FDD (frequency division duplex) or TDD (time division duplex) local- or wide-area networks.

2. Description of the Related Art

The emerging convergence of telecommunications and computing has brought about considerable significance to dynamic multiplexing of voice and data over both wireline and wireless multiaccess channels, such as used in cellular and hybrid fiber-coax (HFC) networks. Bandwidth efficiency is a key consideration for voice-data integration and has been addressed in many studies by applying packet switching to both voice and data portions of the traffic, shunning circuit switching altogether.

For conventional multiple access, speech packets generated during active speech periods contend for channel access in a manner similar to that used for data packets, for instance, on Ethernet LANs. Packet reservation multiple access (PRMA) and derivatives of PRMA, as well as D-TDMA, are the most familiar medium access control (MAC) protocol examples that operate on this basis. Nevertheless, speech packets may encounter excessive delays for conventional multiple access, thereby resulting in speech clipping.

As is well known, bandwidth efficiency is not the only issue that merits attention in packet transmission. Quality of service is another critical factor that must be taken into account to meet the requirements of the underlying applications. In this regard, speech transmission delay should be always upper-bounded to a certain threshold for a satisfactory reception.

What is needed is a technique for dynamically multiplexing voice and data over a multiaccess channel that provides a predetermined quality of service for voice transmission by providing a speech access delay that is always upper bounded to a predetermined threshold.

SUMMARY OF THE INVENTION

The present invention provides a technique for dynamically multiplexing voice and data over a multiaccess channel that provides a predetermined quality of service for voice transmission by providing a speech access delay that is always upper bounded to a predetermined threshold.

The advantages of the present invention are provided by a MAC protocol that operates on an uplink and a downlink channel. The uplink channel has a plurality of frames, such that each frame has a first selectable number of minislots and a second selectable number of slots. When a user has voice traffic that is to be sent, the user sends a reservation request of a first type into a first selected minislot of a selected frame of the uplink channel using a contention-free technique. The reservation request of the first type is for requesting an assignment of at least one slot in at least one frame that is immediately subsequent to the selected frame for transmitting the voice traffic of the user. When a user has data traffic that is to be sent, the user sends a reservation request of a second type into a second selected minislot of the selected frame when such a minislot is available in the selected frame using a contention-based technique. The reservation request of the second type is for requesting an assignment of at least one slot in at least one frame that is subsequent to, but not necessarily immediately after the selected frame, for transmitting the data traffic. The rules for making a contention-based request for transmitting new or previously-colliding reservation requests of the second type by user terminals and for allocating the corresponding uplink channel resources by the central station are governed by a pseudo-Bayesian controlled Aloha algorithm or by a nonobvious blocked-access binary tree algorithm. The central station generates and sends a downlink channel feedback message prior to the end of the selected frame of the uplink channel. The feedback message contains bandwidth assignment information for the next frame of the uplink channel of minislots assigned for reservation requests of the first type, slots assigned to reservations requests of the first type received during the selected frame and, if sufficient bandwidth is available the next frame, minislots assigned for contention-based reservation requests of the second type and/or slots assigned for data traffic corresponding to reservation requests that were successfully sent in the selected frame or a frame prior to the selected frame.

BRIEF DESCRIPTION OF THE DRAWING

The present invention is illustrated by way of example and not limitation in the accompanying figures in which like reference numerals indicate similar elements and in which:

FIGS. 4a–4c show selected reservation and transmission sequences for a speech terminal for a TDMA-based system according to the present invention;

DETAILED DESCRIPTION

The present invention provides a MAC protocol that allows dynamic allocation of voice and data packets over the same channel or set of channels, provides silence compression and background imitation for voice, and guarantees a speech transmission delay to within an acceptable threshold, regardless of the data load that may be sharing the same channel(s). Voice data is served using a contention-free reservation technique, while data applications are served on a best-effort basis. Bandwidth resources are not occupied when the data applications are inactive. Additionally, the present invention is Internet protocol (IP) compatible.

Slots are assigned through bandwidth reservation requests, and used for voice traffic transmission during active speech intervals. Minislots are assigned at the end of speech talkspurts and used for background noise transmission during speech silence intervals. An assigned minislot is used, when a voice user becomes active again, for sending a reservation request in a contention-free manner for a slot assignment for timely transmitting the next active speech talkspurt. Silence compression is used for voice traffic, thereby freeing most of the idle bandwidth that would otherwise be occupied by an inactive voice user during speech silence so that it can be used by concurrent data applications, and thereby increasing channel throughput for data users.

A contention-based reservation scheme is used for sending bandwidth reservation requests for data traffic transmission. Such a reservation request is generated by a data user, when the user has new data arrivals for transmission. The decision of whether to send a reservation request in each frame by a data user and of how to allocate the minislots to all data users is based on the pseudo-Bayesian controlled Aloha algorithm or on the nonobvious blocked-access binary tree algorithm. Slots are assigned upon a successful reservation request for data traffic transmission for each data user.

Figure 1:
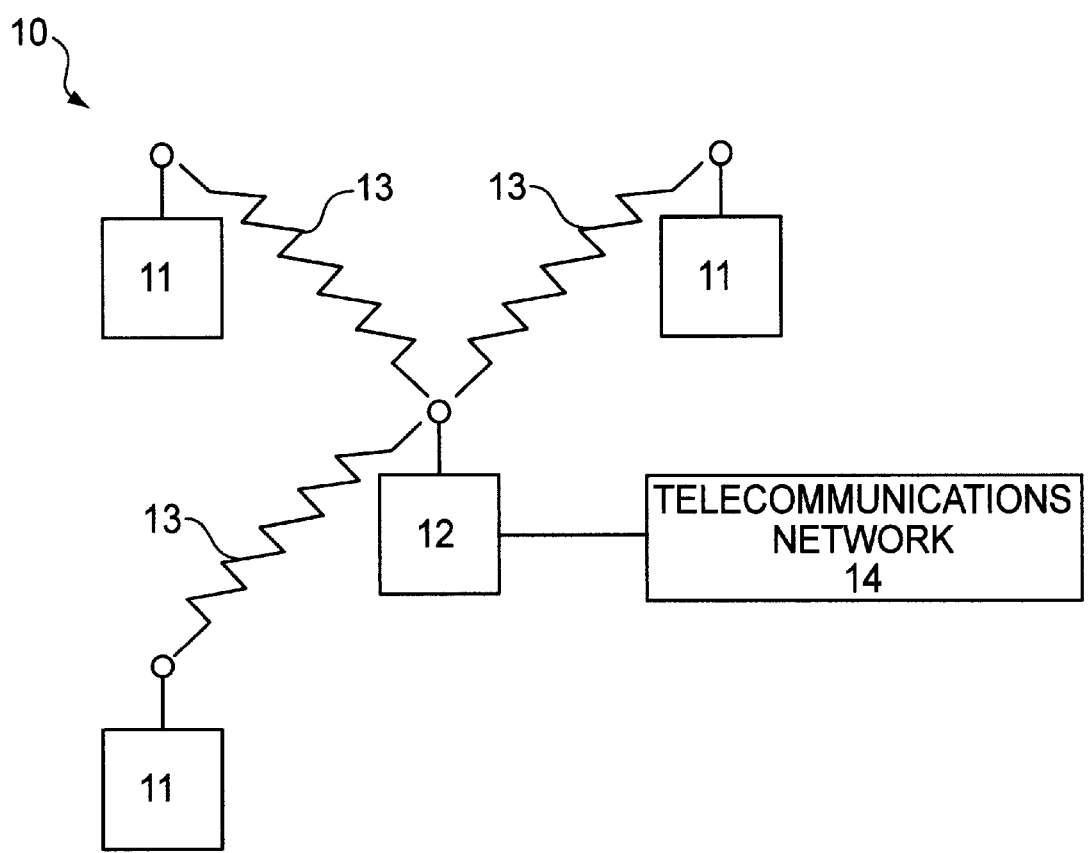
FIG. 1 shows a schematic block diagram of an exemplary wireless environment for which the present invention is suitable.

FIG. 1 shows a schematic block diagram of an exemplary wireless environment 10 for which the present invention is suitable. Geographically dispersed user terminals 11 are provided with packet access to a central transceiver, or station, 12 through a common channel 13. In the wireless environment shown in FIG. 1, central station 12 is a base station or an access point. Preferably, there is a separate broadcast channel carrying control and user messages from central station 12 to user terminals 11. Central station 12 is coupled to a telecommunications network 14 in a well-known manner. While system environment is shown as a wireless link in FIG. 1, environment 10 can also be a wireline link, as in a cable plant.

The communication traffic in a direction from a user terminal 11 to central station 12 over common channel 13 is referred to herein as an uplink. A user terminal 11 may generate different types of traffic, or bit streams, simultaneously, provided that generation and transmission of the respectively different types of traffic, such as periodic (voice) or bursty (data), are controlled by separate "terminals" sharing the same user transceiver. A user message consists of speech or/and data packets. Communication traffic in the other direction over common channel 13 from central station 12 to a user terminal 11 provides essential feedback information in a broadcast mode, and is referred to herein as a downlink.

Preferably, central station 12 and user terminals work together to execute a centralized-distributed algorithm, with central station 12 operating in a "master" mode and user terminals 11 operating in a "slave" mode. Central station 12 monitors uplink multiple access activities, including both contention-free and contention-based reservations, and information transmissions from all admitted user terminals 11, and provides channel status feedback via downlink for contending terminals, as well as minislot and slot assignment for terminal reservation and transmission. User terminals 11 monitor to the downlink feedback message broadcast from central station 12 and accordingly transmit their reservation requests and information packets based on the content of the feedback message. Preferably, the uplink and downlink channels are frequency-division duplex (FDD) channels and time-aligned appropriately.

Figure 2:
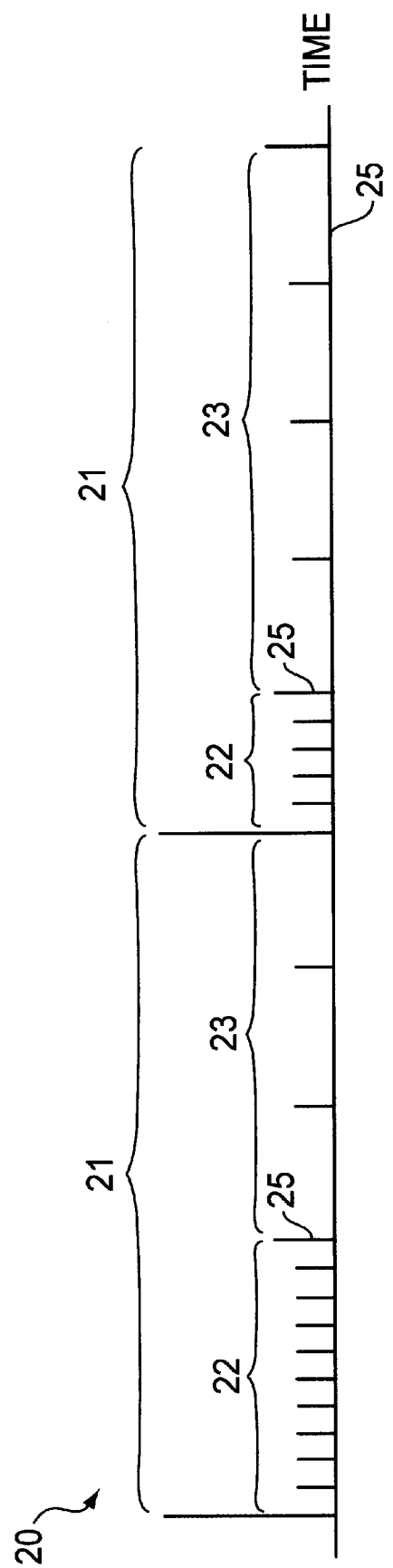
FIG. 2 shows an arrangement of frames, minislots and slots along a time axis for TDMA-based channels according to the present invention.

A multiaccess channel may be a single TDMA-type channel having time slots along the time axis. FIG. 2 shows an arrangement 20 of frames 21, minislots 22 and slots 23 along a time axis 24 for TDMA-based channels according to the present invention. A boundary 25 between minislots 22 and slots 23 is preferably dynamically adjustable according to a current traffic mix. Alternatively, boundary 25 can be prescribed a priori based on an expected traffic mix. In either case, minislots 22 and slots 23 are assigned to voice reservation and transmission on a priority basis, and then to data reservation and transmission on a best-effort basis.

Figure 3:
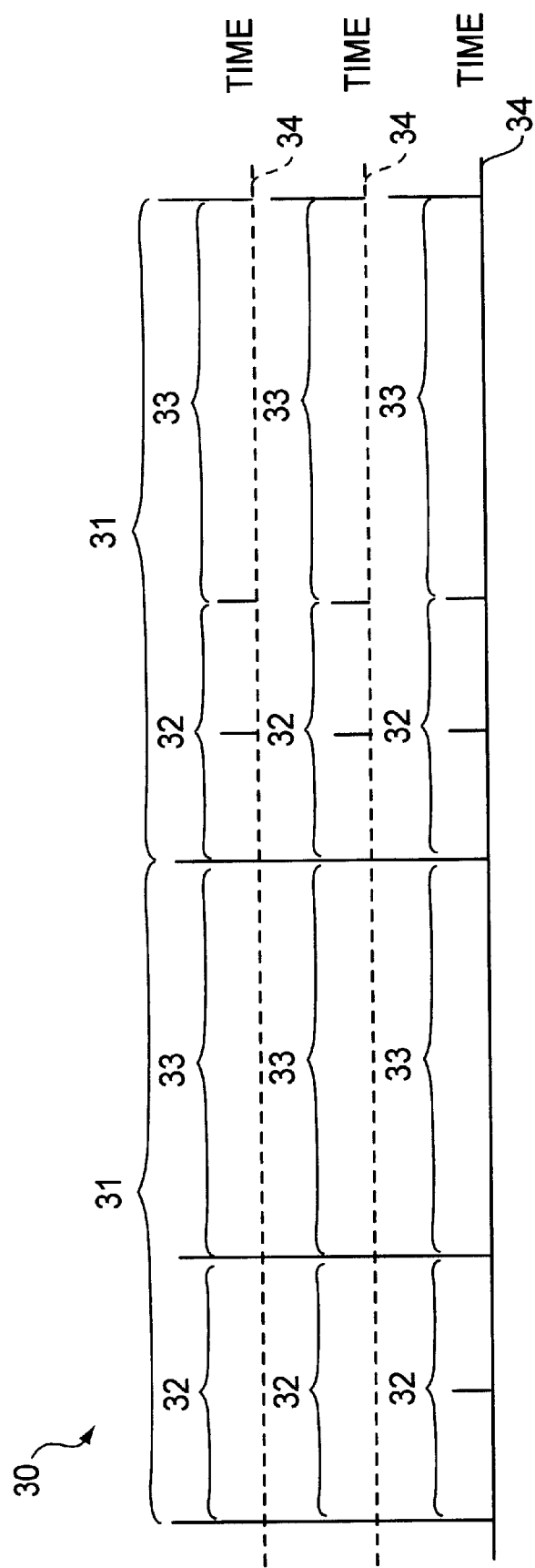
FIG. 3 shows an arrangement of frames, minislots and slots along axes for FDMA- and CDMA-based channels according to the present invention.

A multiaccess channel may also be expanded into a set of FDMA-type channels pooling several frequency bands and thus occupying two dimensions over time and frequency, or into a set of CDMA-type channels formed by both time slots and user codes on a two-dimensional plane as well. FIG. 3 shows an arrangement 30 of frames 31, minislots 32 and slots 33 along axes 34 for FDMA- and CDMA-based channels 36 according to the present invention. In FIG. 3, a frame 31 in each frequency band for an FDMA system, or in each user code for a CDMA system, contains a much smaller number of minislots in comparison to the frame arrangement for a TDMA system, as shown in FIG. 2.

In FIG. 3, a frame 31 for a component of the FDMA or CDMA channels is shown to include only one slot 33, but a frame 31 in the aggregate FDMA or CDMA channels 36 contains as many minislots and slots as a frame arrangement for a TDMA channel. The aggregation of channels functions as a logical shared channel, with the pooled minislots and slots corresponding to the minislots and slots in a single frame in FIG. 2. The frame arrangement in FIG. 3 renders the time scale of a minislot and slot equivalent to that of a slot and frame in FIG. 2, respectively, thereby greatly relaxing synchronization and implementation constraints.

To accommodate the periodic nature of speech and to utilize the server-client layout of the multiaccess channel of the present invention, constant-length frames are used for grouping time slots and minislots so that transmissions in both directions proceed frame by frame, such as shown in FIGS. 2 and 3. Preferably, the length of a frame is longer than the combined round-trip propagation and signal processing time, so that most feedback or control messages are available by the end of the same frame. Further, the length of a frame is preferably not significantly longer than the combined round trip propagation and signal processing time to avoid a large latency. The number and size of slots and minislots in a frame are based on the bit rate of the underlying channel, the intended service of the channel, and implementation constraints. Preferably, a slot contains an integral number of minislots. Minislots are preferably located in the leading portion of a frame, and are convertible to and from slots on a frame-by-frame basis. For an expanded multiaccess channel, a frame encompasses all the pooled frequency bands or user codes. The length of minislots and slots in an expanded multiaccess channel may be much larger than that associated with a segregated TDM channel.

Figure 5:
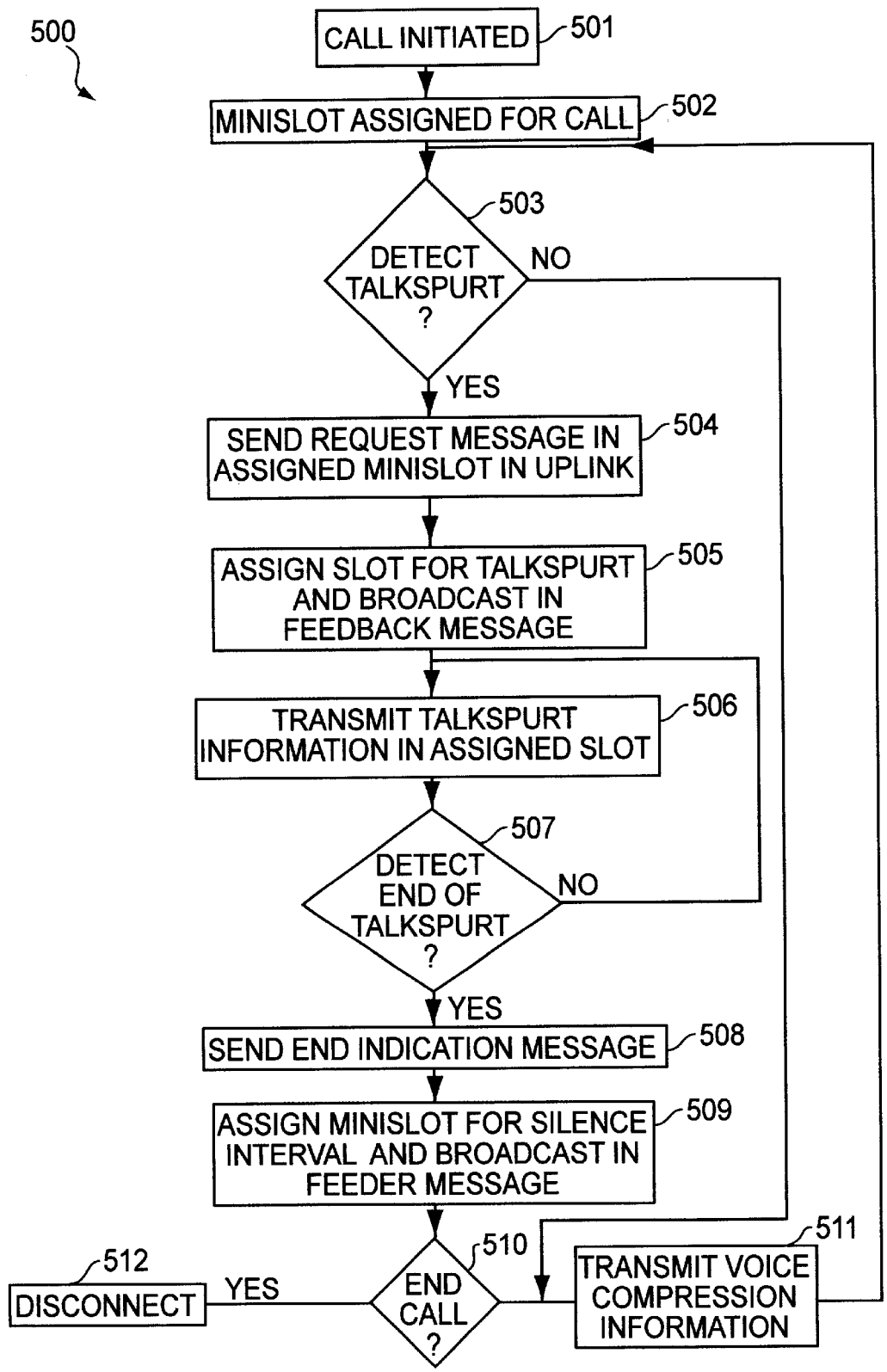
FIG. 5 shows a flow diagram for the selected reservation and transmission sequences of FIGS. 4a–4c.

FIGS. 4a–4c show selected reservation and transmission sequences for a speech terminal for a TDMA-based system according to the present invention. Time runs from FIG. 4a through FIG. 4b and to FIG. 4c. An ellipsis indicates an indefinite time interval. FIG. 5 shows a flow diagram 500 for the selected reservation and transmission sequences of FIGS. 4a–4c.

In FIG. 4a, the voice user at a speech terminal initiates a call set up at 41 in frame m (step 501 in FIG. 5). Accordingly, at step 502, the voice user is assigned a minislot for transmitting a reservation request and communicated by way of a downlink feedback message. The voice user alternates between speech and silence intervals, as detected in a well-known manner by a voice activity detector (VAD). Accordingly, a talkspurt is generated during the speech interval of the voice user. At step 503, when the voice user generates a talkspurt, flow continues to step 504 where a reservation request is sent to a central station in a minislot 42 (frame m+1), which was assigned when the call was initiated. At step 505, after the central station has received the reservation request, a slot is assigned for transmitting a speech payload packet beginning in the subsequent frame. The central office broadcasts the slot assignment information to the voice terminal in a downlink feedback message before the end of the frame in which the reservation request was received (frame m+1). At step 506, the voice data for the call is then transmitted in the assigned slot (slot 43) in frame m+2 and in the same or a nearby slot over successive frames (i.e., slot 43 in frames subsequent to frame m+2) until the current talkspurt ends at 44 in FIG. 4b (frame m+p+1). When the VAD determines that the talkspurt is ending at step 507, flow continues to step 508 where the voice terminal inserts a packet containing an end indication message at 45 (frame m+p), otherwise flow returns to step 506. The last packet containing voice data is sent at 44 (frame m+p+1).

The end indication message is sent during the assigned slot of the penultimate frame of the talkspurt (45 in frame m+p) so that there is sufficient time for the central office to process the end indication message, assign a minislot, and for the voice terminal to respond to the subsequent minislot assignment. That is, assigned slot 44 may be located relatively late in a frame and there may be insufficient time for the central station to process an end indication message and for the voice terminal to respond to a minislot assignment by the beginning of the next frame.

In FIG. 4b, once the central station detects the end indication message at 45 prior to the last voice data packet at 44, central station broadcasts the minislot assignment in the feedback message at step 509, such as minislot 46 in frame m+p+2. Minislot 46 (or a nearby minislot) is assigned to the voice terminal for the call for each of the subsequent frames during the silence interval. The voice user "owns" newly assigned minislot 46 from the frame following the last voice data packet during the silent interval (frame m+p+2) to the end of the silence interval (frame m+p+q+1). At step 510, it is determined whether the call should be terminated or continued. When the call should be continued, flow continues to step to 511 where noise compression information for the voice terminal is transmitted in the assigned minislot in each subsequent frame. Preferably, current noise compression information is transmitted in each respective minislot so that changes in ambient noise level at the voice terminal are reflected at the call destination and a suitable comfort noise is injected into the synthesized speech at the listener receiver. Alternatively, the noise compression information can be updated much less frequently than every minislot, if it cannot be fully transmitted in a single minislot.

In FIG. 4c, when the silence interval ends (step 503) and a speech packet for a talkspurt arrives during frame m+p+q, as detected by the VAD, the assigned minislot is used at 47 (frame m+p+q+1) for sending a message to the central station indicating arrival of a new active speech packet. The central station responds by allocating a slot 48 (frame m+p+q+2) for the speech transmission over the subsequent frames spanning the new talkspurt. The slot assignment is broadcast by the central office in the feedback message. The previously assigned minislot (minislot 46) is deallocated concomitantly from the user voice terminal. Alternating use of slots and minislots then repeats in response to talkspurts and silence intervals, as described above, until the call is completed, in which case, the call is disconnected at step 512.

When the VAD detects a silence interval lasting at least three frames, allocation of a minislot to the inactive speaker limits the delay for transmitting the next active speech packet to between one to three frames. In the situation when the number of admitted voice calls does not exceed the number of slots in a frame (i.e., less than the channel capacity as measured by circuit switching), each voice user occupies either a slot or a minislot at any given time during the duration of the voice user's call. If the frame size is not greater than, for example, 10 ms, the access delay does not become excessive and no speech clipping occurs. In contrast to contention-based protocols, the contention-free speech access of the present invention simultaneously achieves delay bounding, silence compression and background imitation.

According to the present invention, a significant portion of the channel bandwidth can be shared with data traffic during speech silence intervals without jeopardizing speech transmission. That is, the bandwidth resource freed by silence compression can be made available to data sources. Consequently, the basic channel structure shown in FIGS. 2 and 3 is assumed to anticipate the presence of data traffic, with voice traffic taking precedence over data traffic for channel access priority. Preferably, the present invention uses a contention-based reservation technique for sending reservation requests into minislots that are used for requesting slots for data transmission during data active intervals.

To illustrate the shared bandwidth aspect of the present invention, speech traffic statistics for a speech source are first analyzed. As has been often previously done, the alternating active and inactive periods of the speech source can be modeled using independent exponential distributions, and the corresponding probability density functions can be written as $$f_A(t_A)=(1/T_A)\exp(-t_A/T_A), t_A \geq 0, \quad (1)$$

$$ff_1(t_I)=(1/T_I)\exp(-t_I/T_I), t_I \geq 0, \quad (2)$$

where $T_A$ and $T_I$ are the means for active and inactive talk periods, respectively. Accordingly, the number of speech packets generated in an active period is distributed by $$p_A(n_A) = \int_{(n_A-2)F}^{(n_A-1)F} f_A(t_A) dt_A = \left(1 - e^{-1/\overline{T}_A}\right) e^{-(n_A-2)\overline{T}_A}, \quad (3)$$

$$\overline{T}_A = T_A/F, n_A \geq 2.$$

Similarly, the number of packets declared by a VAD to be inactive over a silence period is distributed by $$p_I(n_I) = \int_{(n_I+1)F}^{(n_I+2)F} f_I(t_I \mid t_I \geq 3F) dt_I = \left(1 - e^{-1/\overline{T}_I}\right) e^{-(n_I-2)\overline{T}_I}, \quad (4)$$

$$\overline{T}_I = T_I/F, n_I \geq 2.$$

where F in both Eqs. (3) and (4) denotes the frame length. Thus, the expected number of packets classified as active or inactive by the VAD is given by $$\hat{n}_z = \sum_{n_z=2}^{\infty} n_z p_z(n_z) = 2 + 1/\left(e^{1/\overline{T}_z} - 1\right), z = A, I. \quad (5)$$

By virtue of ergodicity, that is, based on the renewal nature of alternating, independent active and inactive periods, the average number of active and inactive packets $\overline{N}_A$ and $\overline{N}_I$, respectively, that are observable at any given time out of a total number of $N_V$ voice calls admitted into the multiaccess channel under consideration is specified as $$\frac{\overline{N}_A}{N_V} = \frac{\hat{n}_A}{\hat{n}_A + \hat{n}_I}, \frac{\overline{N}_I}{N_V} = \frac{\hat{n}_I}{\hat{n}_A + \hat{n}_I}. \quad (6)$$

As described above, the speech access protocol of the present invention operates by respectively sending active and inactive packets in slots and minislots on a frame-by-frame basis. By design, $N_V \leq N_F$. Thus, $\overline{N}_A$ and $\overline{N}_I$ also represent the average number of slots and minislots, respectively, occupied by $N_V$ voice calls in a given frame. Consequently, if a slot is $m_r$ times larger a minislot, a voice call will on average occupy $g_V=(\hat{n}_A+\hat{n}_I/m_r)/(\hat{n}_A+\hat{n}_I)$ of a slot per frame during the duration of the call. For a voice activity factor of 0.4 and for $m_r=5$, $g_V$ is approximately 0.52. Moreover, out of a total of $N_F$ slots per frame and $N_V$ voice calls, a maximum of $N_V^-=N_F-(\overline{N}_A+\overline{N}_I)/m_r)$ slots may be freed for data transmission, thereby yielding a normalized residual capacity $\lambda_V^-=N_V^-/N_F$.

To serve the bursty nature of data sources, data transmission is predicated upon a random-access reservation. The minislots in each frame that are unused by voice calls are made available for reservation requests for data messages that have arrived at user data terminals and are waiting transmission to the central station. Each successful reservation is entered into a transmission queue that is maintained at the central station. The central station then allocates slots in one or more of the subsequent frames based on a first-come-first-served (FCFS) policy, or another service priority policy (if any), for the exclusive transmission of a data message corresponding to a reservation requesting the transmission. If a minislot used for data reservations is not located sufficiently near to the beginning of a frame, the feedback message relating to the contention status of the minislot (i.e., collision or not) will not be available in the subsequent frame, but will be one frame later. A successful reservation is entered into the central transmission queue in the same delay fashion. Before a data message is transmitted, however, a host terminal (more precisely, the MAC controller inside the host terminal) will not send out another message. The boundary between minislots and slots can be adjusted on a frame-by-frame basis so that new messages promptly secure reservation requests, and that reserved requests promptly transmit their associated messages.

The reservation-transmission (R-T) boundary separating minislots and slots is adjusted from frame to frame so that the overall access delay, that is, the average time for successful reservation plus waiting time for message transmission, is minimized. One suboptimal policy used by the central station for determining and broadcasting the number of minislots and slots, $N_R$ and $N_T$, respectively, for data reservation and transmission in the next frame is based on the reception of the reservations and transmissions from all the user terminals in the previous frame.

For example, suppose that only the minislots located in the first $N_1$ slots of a given frame are processed by a central station and have their status feedback available by the end of the same frame. The remaining minislots $N_2=N_F-N_1$, if any, are processed by the central station and corresponding status feedback is provided in one later frame. Thus, given q data reservations entered in the central transmission queue that are yet to be served, the next frame will have $$N_R=m_r(N_F-N_A-N_T)-N_1, \quad (7)$$

where if $q \leq N_2$ or $q-N_{TM}>N_2-N_A$, with $N_{TM}=N_F-N_A-\lceil N_1/m_r \rceil$, then $$N_T=\min(q, N_{TM}), \quad (7a)$$

or else, with $N'_R=m_r \min(N_1, N_F-N_A)-N_1$, then $$N_T=\min(q, N_F-N_A-(N_I+N'_R)/m_r) \quad (7b)$$

Here, $N_A$ and $N_I$ respectively denote the number of slots and minislots that will be used by the admitted voice calls in the next frame. $N_A$ and $N_I$ will be known to the central station before the feedback message for the next frame is broadcast. $N_{TM}$ specifies the maximum number of slots that may be assigned to data transmission in the next frame accounting for the current speech load. Equation (7a) therefore implies that if the size of the current transmission queue is relatively small or large with respect to the value of $N_2$, the queue will be served to the extent of the next available slots. Equation (7b) applies to a moderate queue size, which is used to preclude reservation requests from being sent into the last $N_2$ slots of the next frame.

After the data transmission slots have been allocated, all the remaining slots are converted into minislots for data reservation so that no slots are wasted in any given frame. Nevertheless, the appearance of $N_1$ and $N_2$ in Eqs. (7a) and (7b) reflects a constrained effort to make data users send reservations in only the first $N_1$ slots in any given frame so that their respective reservation status is timely reflected in the subsequent frame. If reservation requests were indeed sent in minislots such that the status feedback message is not available by the end of the same frame, the terminals sending reservations into those particular minislots resume their appropriate action after one intervening frame based on the feedback message corresponding to the next frame.

Adaptive adjustment of the R-T boundary on a frame-by-frame basis enables voice loaded multiaccess channel to provide data throughput approaching the maximum limit. The maximum data throughput $T_{max}$ in packets per slot may be determined from the equations of equilibrium governing data reservation and transmission, $S_{max}\overline{N}_R = \overline{N}_I = T_{max} N_F$, where $S_{max} = 1/e$ is the maximum throughput of an Aloha protocol used for reservation and $S_{max} = 0.4285356$ is the maximum throughput of a nonobvious blocked-access basic binary tree protocol used for reservation. $\overline{N}_R$ and $\overline{N}_T$ are, respectively, the average numbers of minislots and slots allocated to data users per frame in the equilibrium state. Thus, upon invoking the relationship $N_F = (\overline{N}_1 + \overline{N}_R)/m_r + (\overline{N}_A + \overline{N}_T)$ at maximum throughput, $$T_{\max} = \frac{(N_f - \overline{N}_A) m_r - \overline{N}_I}{N_F m_r (1 + 1/m_r S_{\max})}. \tag{8}$$

In the absence of voice calls (i.e., $\overline{N}_A = N_I = 0$), $T_{max} = 1/(1 + 1/m_r S_{max})$ which is exactly the maximum data throughput of a reservation channel.

For the pseudo-Bayesian control, a terminal is considered to be backlogged as soon as the terminal receives a new message. All contention attempts are performed based on the (approximate) knowledge of the channel backlog at the start of each slot (frame), thereby maximizing successful transmissions (reservations) slot by slot (frame by frame). In its primitive form for a (non-reservation) slotted channel, pseudo-Bayesian controlled Aloha requires backlogged terminals, i.e., terminals having a packet to send, to transmit independently with probability $p = \min(1, 1/n_+)$, where $n_+$ is the estimated backlog at the beginning of each slot and may be updated successively from the value $n_-$ at the last slot. Thus, $$n_+ = \begin{cases} \lambda + \max(0, n_- - 1), & \text{for idle/success in last slot,} \\ \lambda + n_- + (e-2)^{-1}, & \text{for collision in last slot.} \end{cases} \tag{9}$$

In Eq. (9), $\lambda$ accounts for new packet arrivals per slot. It has been found that setting $\lambda = 1/e$, the maximum Aloha throughput, results in no appreciable performance difference. Under such control, as long as the arrival rate is less than the maximum throughput, the protocol remains stable, and no message will be dropped due to repeated collisions.

For a framed, reservation-based voice-loaded multiaccess channel having a pseudo-Bayesian Aloha control for data access according to the present invention, an R-T bandwidth allocation scheme, similar to that defined using Eqs. (7), (7a) and (7b), is described first. The only exception for the present invention is in connection with Eq. 7(b) by the introduction of $N'_R$ instead of $N_R$. Accordingly, $N'_R$ is defined to be $N'_R = m_r \min(N_1, N_F - \overline{N}_A, N_D) - N_1$, where $N_D = \lceil (N_1 + N_+)/m_r \rceil$, and $N_+$ is the current estimated backlog of data messages pending reservation. $N_+$ is updated over each frame in conjunction with the operation of the algorithm. In view of Eqs. (7) and (7b), the purpose for introducing $N_D$ is for allocating as many minislots for data reservations in the next frame for data messages not yet securing a reservation for moderate transmission queue sizes.

For convenience in describing the preferred contention-based algorithms of the present invention, each data message consists of only one packet that requires only one slot for transmission. Thus, the following contention-based algorithms for data traffic illustrate a most conservative reservation-based data transmission protocol, that is, a packet-by-packet contention scheme. Such a packet-by-packet-based protocol provides a lower-bound performance of practical protocols that allow multislot transmission per successful contention by, for example, initial bandwidth reservation or/and by piggybacking requests for additional bandwidth during message transmission.

Figure 6A:
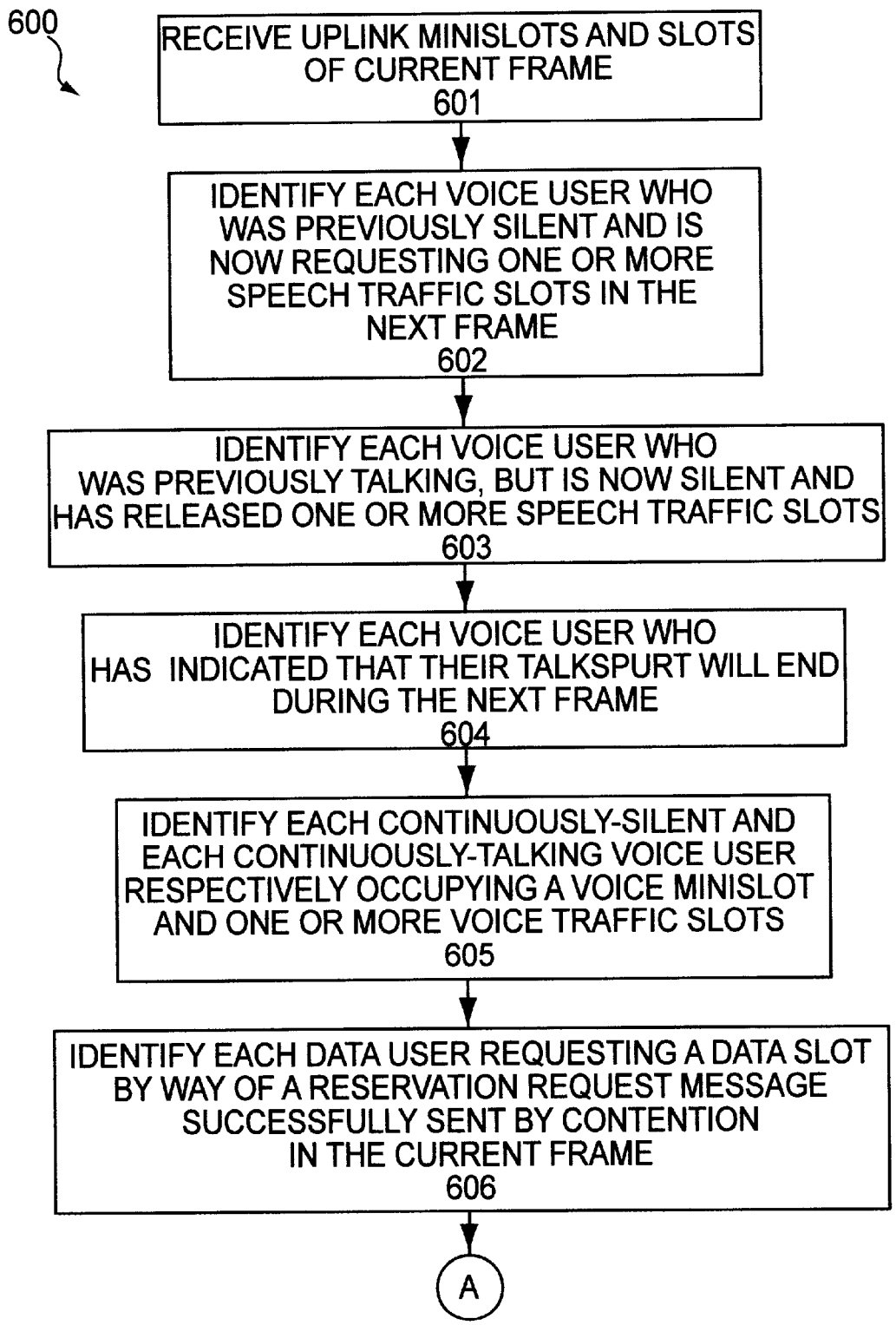
FIGS. 6a–6c show a flow diagram for the portion of the centralized-distributed process performed by a central station for assigning minislots and slots to voice and data users according to the protocol of the present invention for voice-data integrated access by self-reservation and stabilized Aloha contention.
Figure 6B:
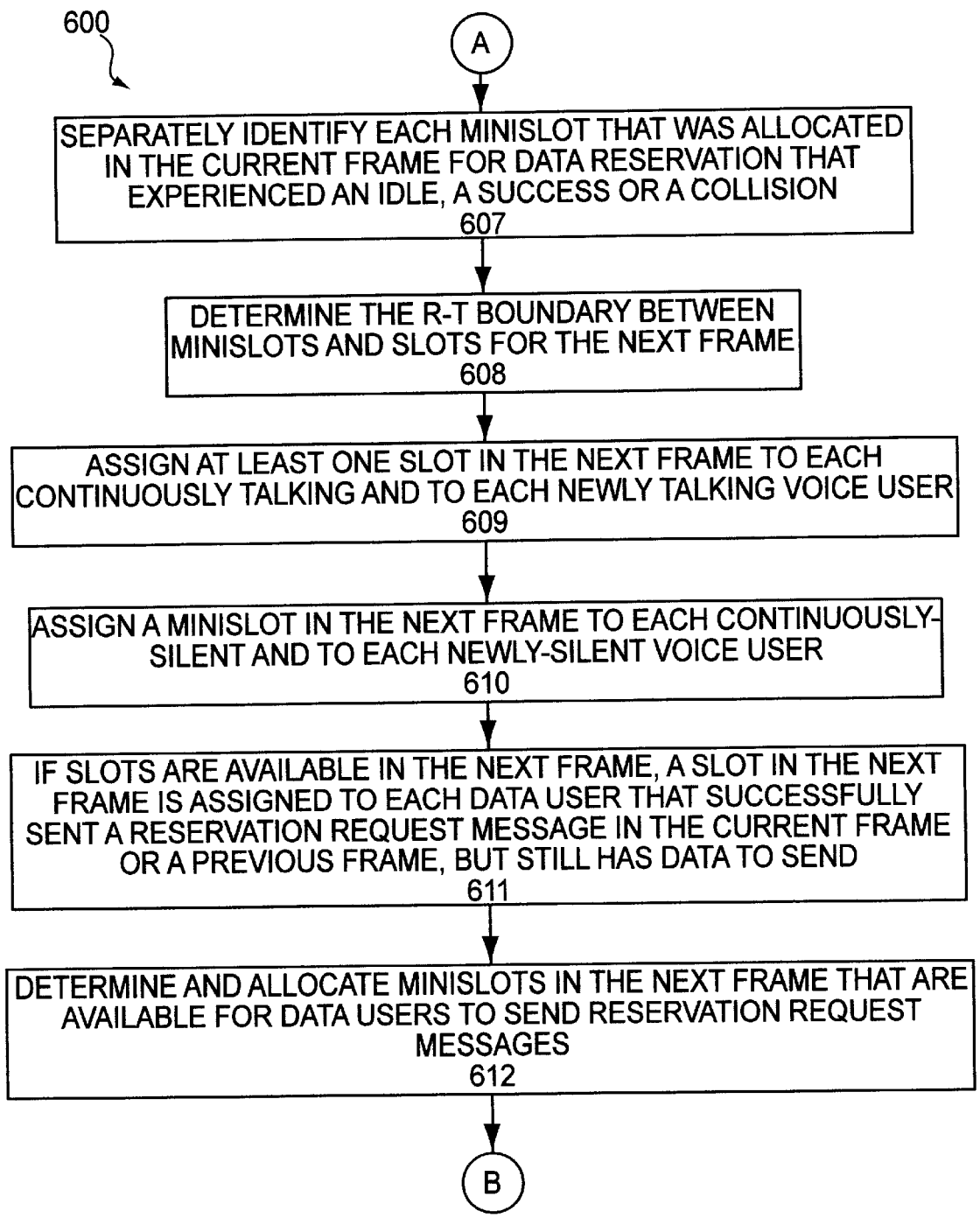
Figure 6C:
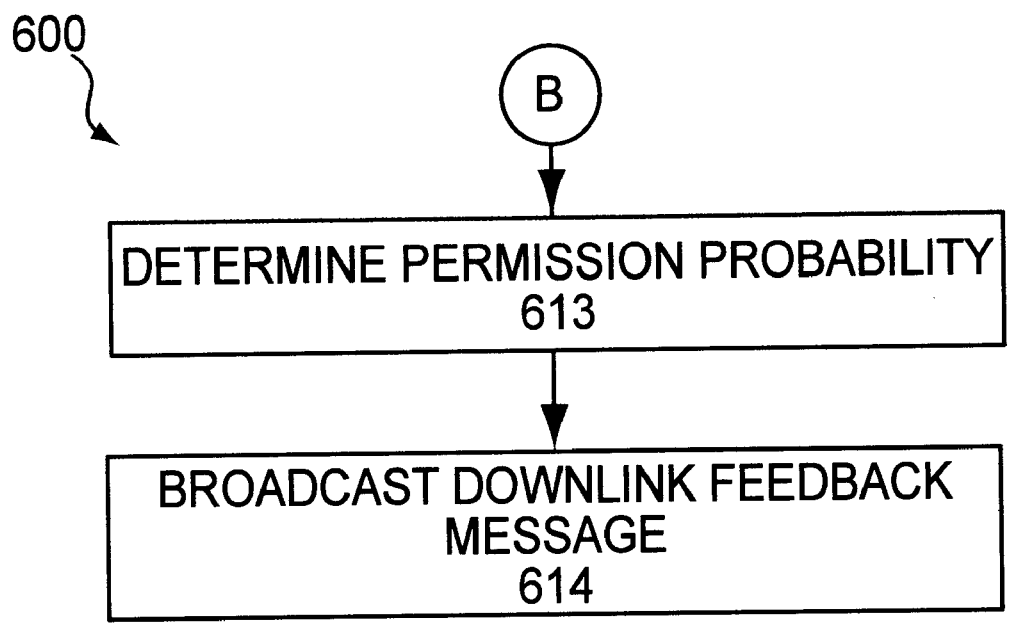

FIGS. 6a–6c show a flow diagram 600 for the portion of the centralized-distributed process performed by a central station for assigning minislots and slots to voice and data users according to the protocol of the present invention for voice-data integrated access by self-reservation and stabilized Aloha contention.

At step 601 in FIG. 6, the central station receives uplink signals in the minislots and slots of a current frame. At step 602, based on the contents of the voice traffic minislots received in the current frame, the central station identifies each voice user who was previously silent and is now requesting one or more speech traffic slots in the next frame. At step 603, based on the contents of the voice traffic slots received in the current frame, the central station identifies each voice user who was previously talking, but is now silent and has released one or more speech traffic slots. At step 604, the central station identifies each voice user who has indicated that their talkspurt will end during the next frame. At step 605, the central station identifies each continuously-silent and each continuously-talking voice user respectively occupying a voice minislot and one or more voice traffic slots. At step 606, the central station identifies each data user requesting a data slot by way of a reservation request successfully sent by contention in the current frame. At step 607, the central station separately identifies each minislot that was allocated in the current frame for data reservation that experienced an idle, a success, or a collision. A minislot that was idle is an allocated minislot in which no data reservation request was sent. A minislot that was a success is an allocated minislot in which only one data reservation request was sent. A minislot that was a collision is a minislot in which more than one data reservation request was sent. The central station processes minislots that were a success and acknowledges receipt of the reservation request in the feedback message that is broadcast at the end of the current frame, as described below.

At step 608, the central station determines the R-T boundary between minislots and slots for the next frame. At step 609, at least one slot in the next frame is assigned to each continuously-talking and to each newly-talking user. At step 610, a minislot in the next frame is assigned to each continuously-silent and to each newly-silent voice user. At step 611, if slots in the next frame are available, a slot in the next frame is assigned to each data user that successfully sent a reservation request in the current frame or in a previous frame, but still has data to send. At step 612, minislots in the next frame that are available for data users to send reservation requests are determined and allocated.

At step 613, the permission probability is determined for data users having a reservation request to send in the minislots allocated as available for data users as $p = \min(1, N_R/N_+)$, where $N_R$ is the number of allocated minislots and $N_+$ is the estimated number of current data users having a reservation request to send, i.e., backlogged. The current backlog $N_+$ is re-estimated at the central station based on the backlog $N_-$ and the number of minislots assigned for data reservations $N_{R-}$ in the previous frame. To do this, the central station takes into account the number of non-collision $n_u$ and collision minislots $n_c$ that occurred in the last frame. Thus, $$N_+ = \lambda_F + n_u \max\left(0, \frac{N_-}{N_{R-}} - 1\right) + n_c\left(\frac{N_-}{N_{R-}} + \frac{1}{e-2}\right). \quad (10)$$

Here, the term "non-collision" means the transmission of zero or one reservation request into a minislot, and the term "collision" means the transmission of more than one reservation request into the same minislot. In Eq. (10), $\lambda_F$ designates new message arrivals per frame and, analogously with Eq. (9), may be set to be the maximum value sustainable over the next frame. In view of Eq. (8), $\lambda_F$ is selected to be $\lambda_F = S_{max}[(N_F - N_A)m_r - N_I]/(1 + m_r S_{max})$ with $S_{max} = 1/e$. In deriving Eq. (10) from Eq. (9), a Poisson distribution for the overall backlog has been assumed, which, if independently routed to k minislots in a random fashion, becomes k sub-backlogs that are independently, identically distributed (i.i.d.) according to Poisson having a mean scaled down by a factor of k. Accordingly, the mean is approximated by the estimate.

If no minislots were available for data reservation during the current frame, that is, all minislots were allocated to silent voice users, only the new data message arrivals are used for updating the backlog for the current frame, viz., $N_+ = \lambda_F + N_-$. If a minislot used for data reservation in the current frame cannot have feedback available by the end of the current frame because of the relative lateness of the minislot in the current frame, the backlog associated with that particular minislot, as well as the successful reservation (if one) out of that minislot, will not be reflected in the next frame, but is reflected in the frame after the next frame. The "partial" backlog based on the relatively-late minislots may be estimated separately by associating $n_u$ and $n_c$, appearing in Eq. (10), with the relatively late minislots only. A terminal that contends in a relatively late minislot knows of the relative lateness of the minislot either by a priori convention or by suitable indication in the feedback message. If a terminal contends in a relatively late minislot, the terminal refrains from further action during the next frame and waits for the feedback message for the next frame.

The maximum voice-loaded data throughput is the same as given in Eq. (8). The multiaccess channel will have guaranteed stability provided the data arrival rate is below the throughput limit.

At step 614, the information relating to data users that successfully sent a reservation request by contention is broadcast by the central station in a downlink feedback message. Additionally, information relating to minislot and slot assignment for both voice and data users, as well as permission probability p are broadcast in the feedback message. Minislots and slots are assigned to voice users on an individual basis for contention-free transmission into them. Slots are also individually assigned to data users for contention-free transmission, but minislots are collectively assigned to data users for contention-based transmission.

Figure 7:
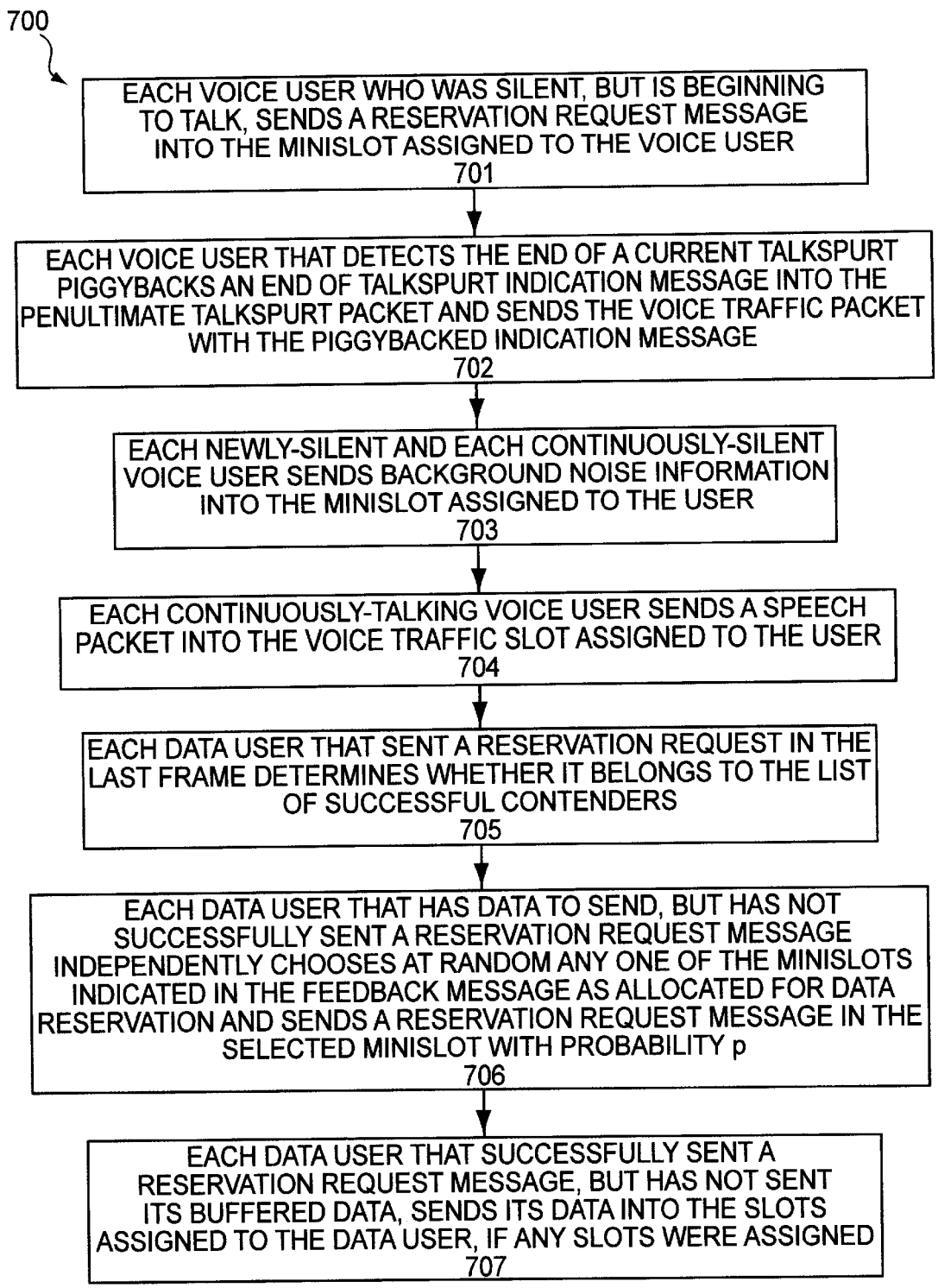
FIG. 7 shows a flow diagram for the portion of the centralized-distributed process performed by each voice and each data user for contention-free and contention-based transmission, respectively, according to the protocol of the present invention for voice-data integrated multiaccess by self-reservation and stabilized Aloha contention.

FIG. 7 shows a flow diagram 700 for the portion of the centralized-distributed process performed by each voice and data user for contention-free and contention-based transmission, respectively, according to the protocol of the present invention for voice-data integrated multiaccess by self-reservation and stabilized Aloha contention.

In FIG. 7, each voice user and data user monitors the downlink feedback message broadcast by the central station and at step 701, each voice user who was silent, but is beginning to talk, sends a reservation request into the minislot assigned to the voice user. At step 702, each voice user that detects the end of a current talkspurt piggybacks an end of talkspurt indication message into the penultimate talkspurt packet and sends the voice traffic packet with the piggybacked end of talkspurt indication in the slot assigned to the voice user. At step 703, each newly-silent and each continuously-silent voice user sends background noise information into the minislot assigned to the user. At step 704, each continously-talking voice user sends a speech packet into the voice traffic slot assigned to the user. At step 705, each data user that sent a reservation request in the last frame determines whether it belongs to the list of successful contenders based on the information in the downlink feedback message or whether the reservation request must be resent. At step 706, each data user that has data to send, but has not successfully sent a reservation request, independently chooses at random any one of the minislots indicated in the feedback message as allocated for data reservation and sends a reservation request into the selected minislot with permission probability p. At step 707, each data user that has successfully sent a reservation request, but has not sent its buffered data, sends its data into the slots assigned to the data user, if any slots were assigned. When the data user has not received a slot assignment by way of the feedback message, the data user takes no action.

The second preferred random access (contention-based) reservation scheme for data is based on a non-obvious blocked-access basic binary tree algorithm, which provides a good tradeoff with respect to performance, complexity, and robustness. In its basic operation on a single slotted channel, collision is resolved by statistically dividing a group of colliding terminals into two subgroups, which then contend separately to transmit their respective data packets as follows.

Figure 8:
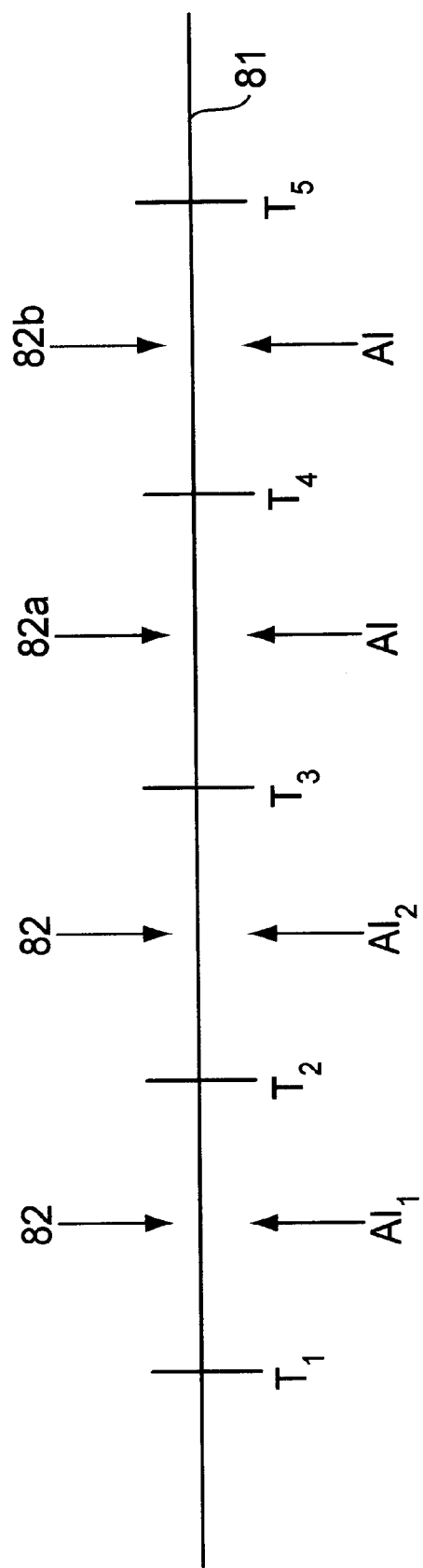
FIG. 8 shows a diagram illustrating a simple blocked-access binary tree contention algorithm.

FIG. 8 shows a diagram illustrating a simple non-obvious blocked-access basic binary tree contention algorithm. In FIG. 8, horizontal axis 81 represents data arrival time, with allocation intervals AI indicated below axis 81 and transmission slots 82 indicated above axis 81. Allocation intervals AI are used for determining whether a data terminal can send a data packet that has arrived, and time slots 82 are used for sending data packets to, for example, a central station. Each allocation interval AI and each time slot 82 have a predetermined duration that is fixed. Although allocation intervals AI and time slots 82 are shown in FIG. 8 as having coinciding time boundaries and intervals, such a requirement is not necessary and may not be desirable. Moreover, only two allocation intervals and two time slots are shown in FIG. 8 for clarity.

In FIG. 8, a first allocation interval $AI_1$ is defined between times $T_1$ and $T_2$ and a second allocation interval $AI_2$ is defined between times $T_2$ and $T_3$. Each data terminal having a data packet arriving during allocation interval $AI_1$ sends their data packet during time slot 82a. Each data terminal having a data packet arriving after $T_2$ is in a waiting interval waiting on the outcome of the contention on time slot 82a. Thus, each data packet arriving after allocation interval $AI_1$ is blocked from transmission. The sequential arrangement of allocation intervals $AI_1$ and $AI_2$ creates a virtual stack. Each data terminal having a data packet arriving during allocation interval $AI_1$ occupies the top level of the stack and each data terminal having a data packet arriving during allocation interval $AI_2$ occupies the next level down in the stack. Of course, there can be multiple allocation intervals, i.e., multiple levels the virtual stack.

If no or only one data terminal sends a data packet into time slot 82a, then there is no collision. (Assume, for purposes of this example, that the central station provides a feedback message so that each data terminal can monitor the channel status of each slot.) When no packets collide, the top level of the stack is removed and each level of the virtual stack is raised, or moved upward, towards the top of the stack by one level.

If two or more data terminals send a data packet in time slot 82a, the packets will collide and the central station will not receive any of the data packets. Upon learning that there was a collision, each of the data terminals that sent a packet in time slot 82a, i.e., data terminals occupying the top level of the stack randomly selects a 0 or a 1 with equal probability, and each data terminal in a waiting interval lowers their respective level in the stack by one level. Each colliding data terminal that selected a 0 remains at the top level of the stack and resends the data packet in time slot 82b, while each colliding data terminal that selected a 1 lowers its level in the stack by one level to occupy the next to the top level of the stack. All terminals then wait the outcome of time slot 82b. If there is no collision in time slot 82b, then each data terminal occupying a level in the stack raises its level by one. Data terminals occupying an updated top level after a "no collision" event would send their data packet during the next time slot. If there is a collision during time slot 82b, then the colliding terminals randomly select a 0 or a 1 with equal probability. Each colliding terminal selecting a 0 stays on the top level of the stack and sends its data packet in the next time slot. Each colliding terminal selecting a 1 lowers its level in the stack by one level, as does all other terminals at lower levels in the stack waiting to send a data packet. The process continues with data terminals having newly arriving data packets in later and later allocation intervals occupying lower and lower levels of the stack.

The allocation interval size A may be chosen for maximizing channel throughput. For Poisson traffic, the channel attains a maximal throughput of $S_{max}=0.4285356$ packets per slot when $S_{max}\Delta=1.035758$ packets, i.e., when $\Delta=2.4169705$ slots. As long as the arrival rate (in packets per slot) is below $S_{max}$, the channel will be stable.

Preferably, the blocked-access binary tree contention process utilized by the present invention applies to data terminals sending reservation requests into minislots of a framed channel for obtaining a slot assignment for sending a data message. According to this aspect of the invention, the number of minislots available in the next frame is dynamically determined by the central station and communicated in the feedback message. A contending terminal monitors the feedback message and determines whether its reservation request will be (re)transmitted in a minislot in the next frame based on the outcome of the contention on the data minislots in the last frame and the update of allocation intervals as well as the availability of data minislots in the next frame. Any number of minislots can be available for reservation requests, including the situation when no minislots are available. When no minislots are available, all contending terminals wait until available minislots are indicated by the feedback message. Moreover, available minislots used for sending reservation requests do not need to be consecutively adjacent to each other in a frame, but merely need to be identified so that contending terminals can determine which minislot(s) is (are) available.

The availability of multiple minislots in a given frame also allows for parallel operation of several allocation intervals and for parallel resolution within individual allocation intervals. New groups of terminals in a reservation waiting set may be accepted for contention when additional minislots are available while existing groups or subgroups undergo collision resolution. The allocation length on the arrival time axis of each new group for the reservation system δ can be optimized for maximum system throughput, which is attained at $T_{max}\delta=1.035758$ packets, where $T_{max}$ is given as in Eq. (8) in terms of packets per slot with $S_{max}=0.4285356$. Thus, δ is selected to be $\delta=1.035758/T_{max}$ slots, or equivalently, $\delta=1.035758/N_F T_{max}$ frames, where $N_F$ denotes the size of a frame in slot units. A separate virtual stack is established based on allocation intervals for tracking the order of contention of terminals having messages to transmit but have not successfully sent a reservation request.

The tree algorithm operates in conjunction with an R/T policy as follows. Suppose the central station has just processed the minislots located in the first $N_1$ slots of the last frame, with minislots located in the remaining $N_2$ slots (if any) being processed in the next frame because of feedback delay considerations. Also, suppose that the central station has determined that there are now q reservations in the transmission queue yet to be given transmission slots (waiting period) and that there are c subgroups of terminals pending the collision resolution of their reservation requests in the next frame. The central station then removes the groups (or subgroups) that did not experience collision in the last frame from the stack and the levels of the remaining groups advance accordingly. The central station also calculates the number of minislots and slots for data reservation and transmission, $N_R$ and $N_T$, respectively, in the next frame according to Eqs. (7), (7a) and (7b), where $N'_R=m_r \min(N_1, N_F-N_A, N_D)-N_1$, $N_D) = \lceil(N_1+N_+)/m_r\rceil$, $N_+=c+\lfloor(t_f-t_{b-})/\delta\rfloor$, in which $t_f$ denotes the start time of the next frame, and $t_{b-}$ denotes the last blocking point on the message arrival time axis.

As for pseudo-Bayesian controlled Aloha, $N_+$ is an estimate of the pending message reservations in terms of next contention subgroups. The introduction of $N_D$ again attempts to match the number of minislots for next data reservation with that of data messages yet to obtain a reservation for moderately sized transmission queues. If $N_R>c$, new allocation intervals can be opened from the waiting set (for reservation), thus advancing the next blocking point to $t_{b+}=\min(t_f, t_{b-}+\delta(N_R-c))$.

Upon receiving the feedback message from the central station, data terminals having unsuccessful reservations update their respective positions in the virtual stack maintained locally based on the announced number of colliding and non-colliding groups of terminals that sent reservation requests into minislots in the last frame. The update by all the backlogged terminals brings the number of total new resolution-pending subgroups to c.

In the case where $N_R>c$, all updated subgroups send their respective reservation requests into their corresponding minislots out of the $N_R$ minislots assigned for the next data reservation. The correspondence is the link of the order of the subgroup positions in the virtual stack to the order of the announced minislots. Terminals that had message arrivals after the previous blocking point $t_{b-}$, but before the new blocking point $t_{b+}$, send their reservation requests independently into any one of the $N_R-c$ minislots set aside for new reservations. The position of the minislots chosen determines their associated groups and, hence, their respective levels in the virtual stack, which already contained c levels of subgroups. On the other hand, when $N_R<c$, no new reservation requests will be initiated, and only $N_R$ of the c subgroups that are located in the first $N_R$ levels in the virtual stack contend for a data reservation in the next frame. The remaining subgroups wait for their reservation opportunities in subsequent frames. The process thus repeats from one frame to the next.

If data reservations used minislots belonging to the last $N_2$ slots of a given frame, their reservation status will be reflected, not in the next frame, but one frame later. Accordingly, the central station does not account for the contending groups of terminals using the relatively late minislots, nor will the contending groups of terminals take any action themselves until one frame later.

Finally, the maximum data throughput of the multiaccess channel at a given voice load is given as in Eq. (8), with $S_{max}$=0.4285356, for the non-obvious blocked-access basic binary tree algorithm as used for data reservation according to the present invention.

Figure 9A:
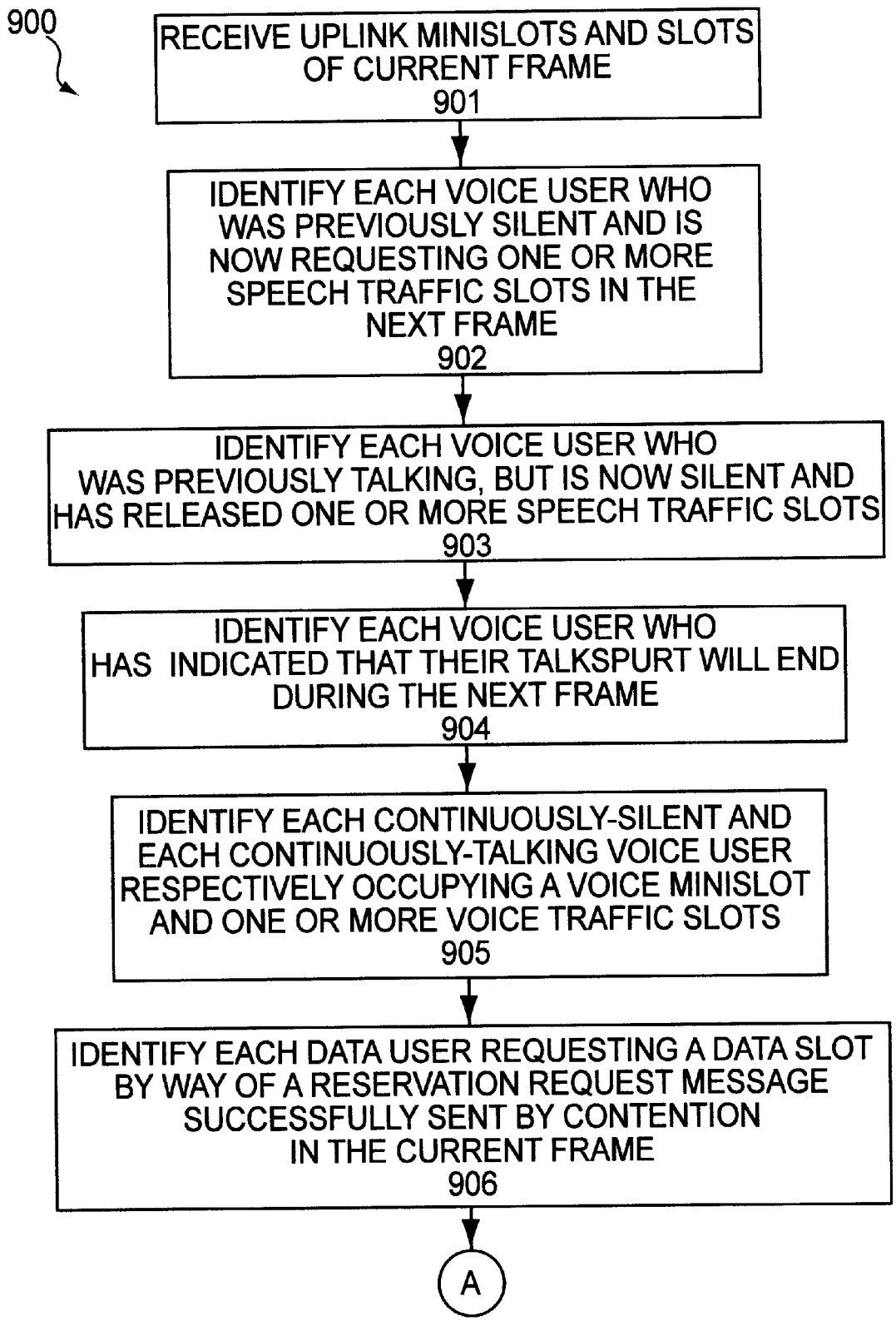
FIGS. 9a–9c show a flow diagram for the portion of the centralized-distributed process performed by a central station for minislot and slot assignment to voice and data users according to the protocol of the present invention for voice-data integrated multiaccess by self-reservation and blocked binary tree resolution.
Figure 9B:
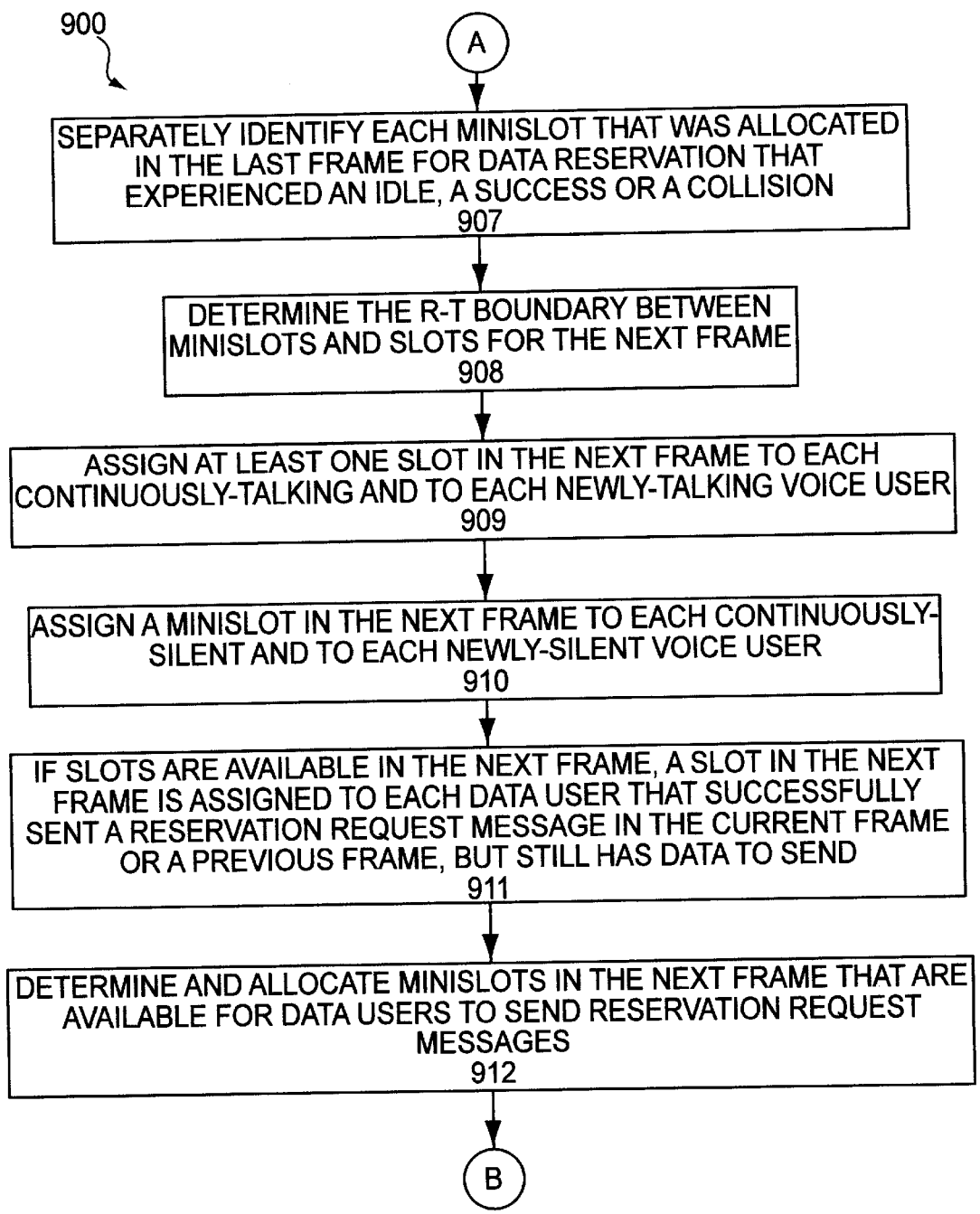
Figure 9C:
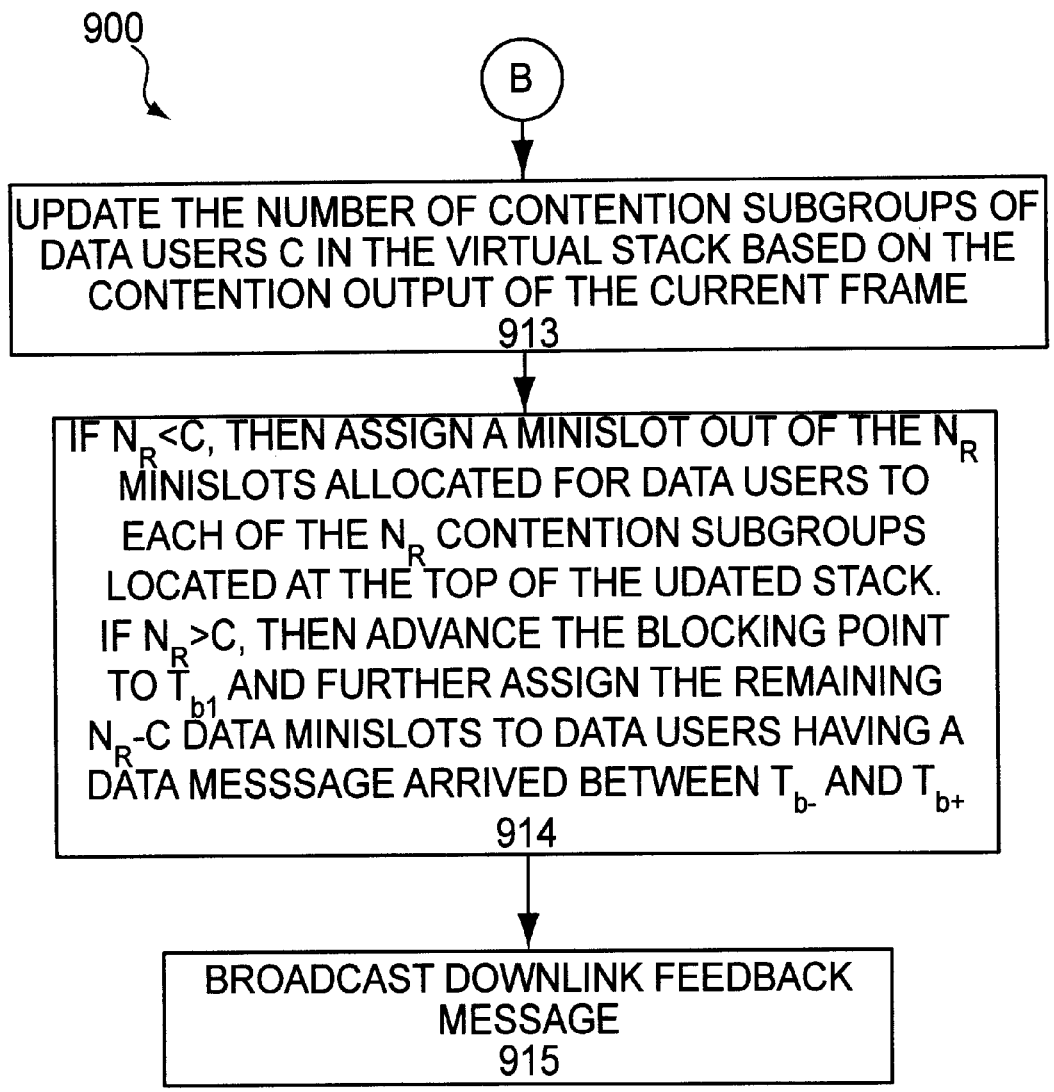

FIGS. 9a–9c show a flow diagram 900 for the portion of the centralized-distributed process performed by a central station for minislot and slot assignment to voice and data users according to the protocol of the present invention for voice-data integrated multiaccess by self-reservation and blocked binary tree resolution.

At step 901 in FIG. 9, the central station receives uplink signals in the minislots and slots of a current frame. At step 902, based on the contents of the voice traffic minislots received in the current frame, the central station identifies each voice user who was previously silent and is now requesting one or more speech traffic slots in the next frame. At step 903, based on the contents of the voice traffic slots received in the current frame, the central station identifies each voice user who was previously talking, but is now silent and has released one or more speech traffic slots. At step 904, the central station identifies each voice user who has indicated that their talkspurt will end during the next frame. At step 905, the central station identifies each continuously-silent and each continuously-talking voice user respectively occupying a voice minislot and one or more voice traffic slots. At step 906, the central station identifies each data user requesting a data slot by way of a reservation request successfully sent by contention in the current frame. At step 907, the central station separately identifies each minislot that was allocated in the current frame for data reservation that experienced an idle, a success, or a collision. The central station processes minislots that were a success and acknowledges receipt of the reservation request in the feedback message that is broadcast at the end of the current frame, as described below.

At step 908, the central station determines the R-T boundary between minislots and slots for the next frame. At step 909, at least one slot in the next frame is assigned to each continuously-talking and to each newly-talking user. At step 910, a minislot in the next frame is assigned to each continuously-silent and to each newly-silent voice user. At step 911, if slots in the next frame are available, a slot in the next frame is assigned to each data user that successfully sent a reservation request in the current frame or in a previous frame, but still has data to send. At step 912, minislots in the next frame that are available for data users to send reservation requests are determined and allocated.

At step 913, the central station updates the number of contention subgroups of data users in the virtual stack as $c=c_- - n_{idle} - n_{success} + n_{collision}$, where $c_-$ is the number of contention subgroups in the last frame, and $n_{idle}$, $n_{success}$, and $n_{collision}$ are the number of minislots assigned for data reservation in last frame that experienced an idle, a success, or a collision, respectively, as described above. Conceptually, the contention subgroups are each located in a level of a stack. The occurrence of an idle or success minislot removes the contention subgroup that was assigned to that minislot out of the stack, thus moving each subgroup that was located below the removed subgroup up in the stack. The occurrence of a collision minislot statistically splits the particular contention subgroup that was assigned to that minislot into two subgroups, with one subgroup remaining at the original level and the other subgroup being located one level below. As a result, each subgroup that was located below the split subgroup will be lowered one additional level in the stack.

At step 914, if $N_R$<c, the central station assigns a minislot out of the $N_R$ minislots allocated for data users to each of the $N_R$ contention subgroups located at the top of the updated stack. If, at step 914, $N_R$>c, the central station advances the allocation time (i.e., the blocking point) to $t_{b+=min(tf, t_{b-}+\delta(N_R-c))}$, where $t_f$ denotes the start time of the next frame, $t_{b-}$ denotes the previous allocation time on the message arrival time axis, and $\delta=1.035758/T_{max}$ slots, with $T_{max}$ defined in Eq. (8). By advancing the allocation time, the central station statistically divides the users having data arriving between the old allocation time $t_{b-}$ and the new allocation time $t_{b+}$ into $n_{new}=N_R-c$ subgroups. The central station further appends these subgroups in the stack, with each subgroup occupying a level. The central station then assigns a minislot out of the $N_R$ minislots allocated for data users to each of the $N_R$ contention subgroups contained in the updated stack.

At step 915, the information relating to data users that successfully sent a reservation request by contention is broadcast by the central station in a downlink feedback message. Additionally, information relating to minislot and slot assignment for both voice and data users, as well as allocation time $t_{b+}$ and the number of new contention subgroups $n_{new}$ are broadcast in the feedback message. Minislots and slots are assigned to voice users on an individual basis for contention-free transmission into them. Slots are also individually assigned to data users for contention-free transmission, but minislots are collectively assigned to data users of the same contention subgroups for contention-based transmission.

Figure 10A:
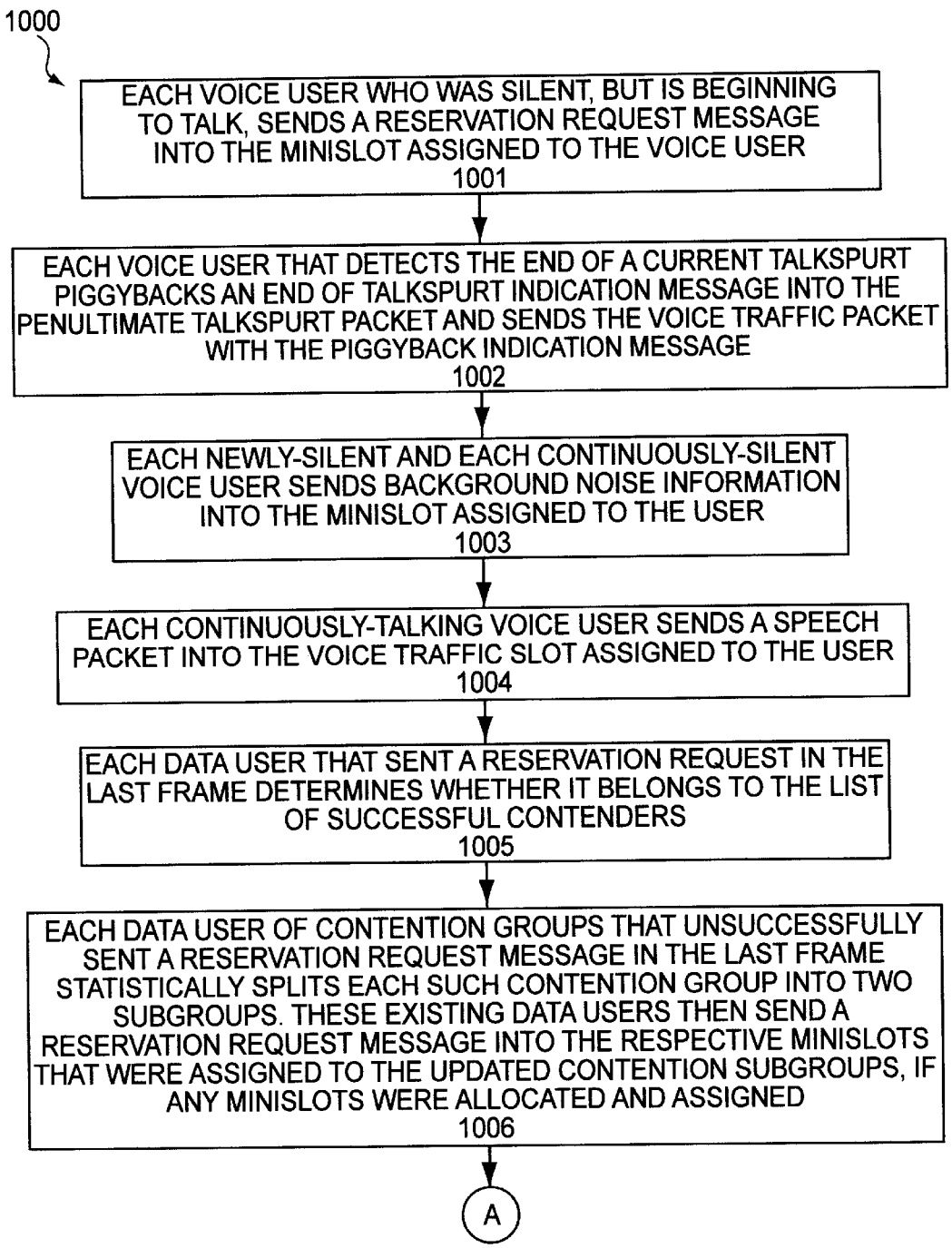
FIGS. 10a–10b show a flow diagram for the portion of the centralized-distributed process performed by each voice and each data user for contention-free and contention-based transmission, respectfully, according to the protocol of the present invention for voice-data integrated multiaccess by self-reservation and blocked binary tree resolution.
Figure 10B:
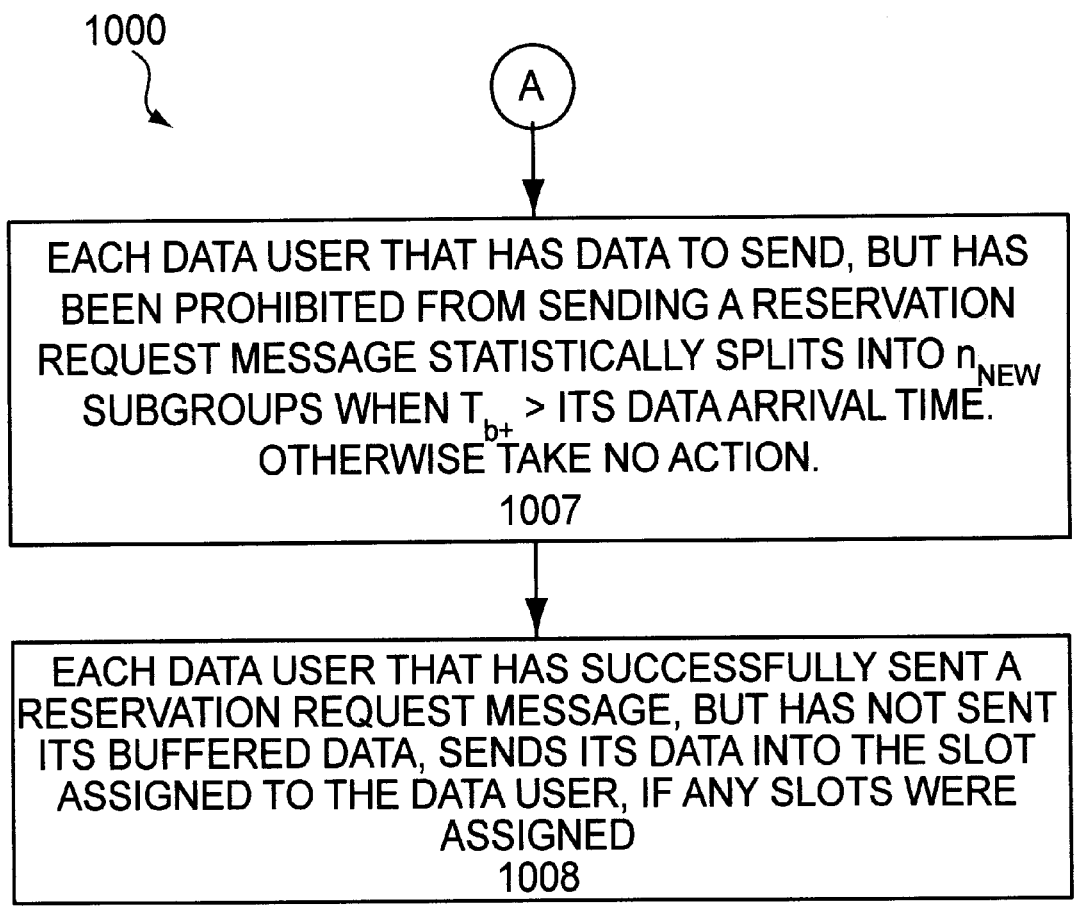

FIGS. 10a–10b show a flow diagram 1000 for the portion of the centralized-distributed process performed by each voice and each data user for contention-free and contention-based transmission, respectfully, according to the protocol of the present invention for voice-data integrated multiaccess by self-reservation and blocked binary tree resolution.

In FIG. 10, each voice user and data user monitors the downlink feedback message broadcast by the central station and at step 1001, each voice user who was silent, but is beginning to talk, sends a reservation request into the minislot assigned to the voice user. At step 1002, each voice user that detects the end of a current talkspurt piggybacks an end of talkspurt indication message into the penultimate talkspurt packet and sends the voice traffic packet with the piggybacked end of talkspurt indication in the slot assigned to the voice user. At step 1003, each newly-silent and each continuously-silent voice user sends background noise information into the minislot assigned to the user. At step 1004, each continuously-talking voice user sends a speech packet into the voice traffic slot assigned to the user. At step 1005 each data user that sent a reservation request in last frame determines whether it belongs to the list of successful contenders based on the information in the downlink feedback message or whether the reservation request must be resent.

At step 1006, each data user of existing contention groups that unsuccessfully sent a reservation request in last frame statistically splits each such contention group into two subgroups. Then, the data users of statistically split new subgroups send a reservation request into respective minislots that were assigned to the updated contention subgroups, if any minislots were allocated and assigned. If no minislots were allocated for new contention subgroups, the allocation time remains unchanged and each data user with data arrival time>allocation time is prohibited from sending a reservation request into any minislot.

At step 1007, each data user that has data to send, but has been prohibited from sending a reservation request statistically splits into $n_{new}$ contention subgroups if $t_{b+}$>its data arrival time. These particular data users then each independently choose, with equal probability, any one of the minislots assigned to the $n_{new}$ contention subgroups and send a reservation request into their respective chosen minislots. Otherwise, these particular data users take no action.

At step 1008, each data user that has successfully sent a reservation request messages in a previous frame other than the immediately preceding frame, but were not assigned minislots for retry in last frame, now send a reservation request message into any minislots assigned to their contention subgroups, if any such minislots were available and allocated. Otherwise, these particular data users take no action.

Although the present invention has been described in terms of voice traffic having priority over data traffic, the present invention is not so limited. In actuality, the present invention is applicable to any type of communication traffic that has priority over another type of communication traffic. For example, access to a communication channel can be controlled for data traffic having a relatively high level of service priority based on the contention-free aspect of the present invention, and access to the channel for data traffic having a relatively lower level of service priority can be controlled based on the contention-based aspect of the present invention.

While the present invention has been described in connection with the illustrated embodiments, it will be appreciated and understood that modifications may be made without departing from the true spirit and scope of the invention.

What is claimed is:

1. A multiple access communication protocol, comprising:
   an uplink channel having a plurality of frames, each frame having a first selectable number of minislots and a second selectable number of slots, a reservation request of a first type being sent into a first selected minislot of a selected frame of the uplink channel when information of a first type is to be sent, the reservation request of the first type requesting an assignment of at least one slot for transmitting information of the first type in at least one frame that is subsequent to the selected frame, a reservation request of a second type being sent into a second selected minislot of the selected frame when the second selected minislot is available in the selected frame and when information of a second type is to be sent, the reservation request of the second type requesting an assignment of at least one slot for transmitting information of the second type in at least one frame that is subsequent to the selected frame, the reservation request of the second type contending for the second selected minislot based on a blocked binary tree algorithm; and
   a downlink channel containing a feedback message having minislot assignment information for sending reservation requests of the first and the second type, slot assignment information for transmitting information of the first and the second type, minislot contention information for the reservation requests of the second type sent in the selected frame, and allocation time information for the reservation requests of the second type to be initiated in a frame after the selected frame on behalf of the information of the second type, the feedback message occurring prior to an end of the selected frame of the uplink channel.

2. The multiple access communication protocol according to claim 1, wherein the reservation requests of the second type are sent into the second selected minislots, each second selected minislot being selected by a central station for a contention subgroup of terminals identified by a level in a virtual stack from a plurality of minislots available for sending the reservation requests of the second type that have experienced a collision not yet resolved.

3. The multiple access communication protocol according to claim 1, wherein the reservation requests of the second type are sent into the second selected minislots, each second selected minislot being selected independently and at random with equal probability from a plurality of minislots available for sending new reservation requests of the second type on behalf of the information of the second type arriving between an old allocation time and a new allocation time.

4. The multiple access communication protocol according to claim 2, wherein the reservation request of the second type is sent when a virtual stack level associated with the reservation request of the second type has a smaller value than the number of minislots available for sending reservation requests of the second type.

5. The multiple access communication protocol according to claim 3, wherein the reservation request of the second type is sent when the number of virtual stack levels associated with the reservation requests of the second type undergoing collision resolution is smaller than the number of minislots available for sending reservation requests of the second type.

6. The multiple access communication protocol according to claim 1, wherein the feedback message includes slot assignment information for at least one frame following the selected frame.

7. The multiple access communication protocol according to claim 1, wherein the feedback message includes information relating to a number of minislots available in a frame after the selected frame for sending reservation requests of the second type, and information relating to a new allocation time for reservation requests of the second type to be initiated in a frame after the selected frame on behalf of information of the second type.

8. The multiple access communication protocol according to claim 1, wherein the minislot contention information includes information relating to a successful sending of the reservation requests of the second type.

9. The multiple access communication protocol according to claim 1, wherein the minislot contention information includes information relating to a collision of the reservation requests of the second type.

10. The multiple access communication protocol according to claim 1, further comprising a step of adjusting a virtual stack level value identifying a contention subgroup of terminals sending the reservation request of the second type based on the minislot contention information.

11. The multiple access communication protocol according to claim 10, wherein the step of adjusting the virtual stack level value includes a step of subtracting one from the virtual stack level value identifying the contention subgroup of terminals sending the reservation request of the second type for each noncolliding contention subgroup of terminals identified by a virtual stack level that is less than the virtual stack level associated with the reservation request of the second type.

12. The multiple access communication protocol according to claim 10, wherein the step of adjusting the virtual stack level value includes a step of adding one to the virtual stack level value identifying the contention subgroup of terminals sending the reservation request of the second type for each colliding contention subgroup of terminals identified by a virtual stack level that is less than the virtual stack level associated with the reservation request of the second type.

13. The multiple access communication protocol according to claim 1, wherein the information of the first type is a talkspurt of a voice message, and the information of the second type is a data message.

14. The multiple access communication protocol according to claim 1, wherein the information of the first type is transmitted in the uplink channel in a slot in a frame that is subsequent to the selected frame that is assigned in response to the reservation request of the first type.

15. The multiple access communication protocol according to claim 14, wherein an end indication message is sent in the slot in the frame that is subsequent to the selected frame that is assigned in response to the reservation request of the first type when transmission of the information of the talkspurt is ending.

16. The multiple access communication protocol according to claim 15, wherein the downlink channel contains a message having a minislot assignment in response to the end indication message.

17. The multiple access communication protocol according to claim 1, wherein the first selectable number of minislots and the second selectable number of slots are each predetermined.

18. The multiple access communication protocol according to claim 1, wherein the first selectable number of minislots and second selectable number of slots are each adjustable.

19. The multiple access communication protocol according to claim 1, wherein the uplink and downlink channels are part of a time division multiple access communication system.

20. The multiple access communication protocol according to claim 1, wherein the uplink and downlink channels are part of a frequency division multiple access communication system.

21. The multiple access communication protocol according to claim 1, wherein the uplink and downlink channels are part of a code division multiple access communication system.

22. The multiple access communication protocol according to claim 1, wherein the at least one slot assigned for transmitting information of the first type is assigned based on a contention-free reservation mechanism.

23. A method for providing multiple access to a communication channel, the method comprising steps of:
forming an uplink channel having a plurality of frames, each frame having a first selectable number of minislots and a second selectable number of slots;
receiving a reservation request of a first type contained in a first selected minislot of a selected frame of the uplink channel when information of a first type is ready to be sent, the reservation request of the first type requesting an assignment of at least one slot for transmitting information of the first type in at least one frame that is subsequent to the selected frame;
assigning at least one first slot in response to the received reservation request of the first type;
receiving a reservation request of a second type contained in a second selected minislot of the selected frame when the second selected minislot is available in the selected frame and when information of a second type is ready to be sent, the reservation request of the second type requesting an assignment of at least one slot for transmitting information of the second type in at least one frame that is subsequent to the selected frame, the reservation request of the second type contending for the second selected minislot based on a blocked binary tree algorithm;
broadcasting a feedback message in a downlink channel before an end of the selected frame, the feedback message containing minislot assignment information for sending reservation requests of the first and the second type, slot assignment information for transmitting information of the first and the second type, minislot contention information for the reservation requests of the second type received in the selected frame, and allocation time information for the reservation requests of the second type to be initiated in a frame after the selected frame on behalf of the information of the second type.

24. The method according to claim 23, wherein the feedback message includes slot assignment information for at least one frame following the selected frame.

25. The multiple access communication protocol according to claim 23, wherein the feedback message includes information relating to a number of minislots available in a frame after the selected frame for sending reservation requests of the second type, and information relating to a new allocation time for reservation requests of the second type to be initiated in a frame after the selected frame on behalf of information of the second type.

26. The method according to claim 23, wherein the minislot contention information includes information relating to successful receipt of the reservation requests of the second type.

27. The method according to claim 23, wherein the minislot contention information includes information relating to a collision of the reservation requests of the second type.

28. The method according to claim 23, wherein the information of the first type is a talkspurt of a voice message, and the information of the second type is a data message.

29. The method according to claim 23, further comprising a step of receiving information of the first type in the uplink channel in a slot in a frame that is subsequent to the selected frame that was assigned in response to the reservation request of the first type.

30. The method according to claim 29, further comprising a step of receiving an end indication message in the slot in a frame that is subsequent to the selected frame that was assigned in response to the reservation request of the first type when transmission of the information of the first type is ending.

31. The method according to claim 30, further comprising a step of broadcasting a message having a minislot assignment in response to the end indication message.

32. The method according to claim 23, wherein the first selectable number of minislots and the second selectable number of slots are predetermined.

33. The method according to claim 23, wherein the first selectable number of minislots and the second selectable number of slots are adjustable.

34. The method according to claim 23, wherein the uplink and downlink channels are part of a time division multiple access communication system.

35. The method according to claim 23, wherein the uplink and downlink channels are part of a frequency division multiple access communication system.

36. The method according to claim 23, wherein the uplink and downlink channels are part of a code division multiple access communication system.

37. The method according to claim 23, wherein the at least one slot assigned for transmitting information of the first type is assigned based on a contention-free reservation mechanism.

38. A method for providing multiple access to a communication channel, the method comprising steps of:
sending a reservation request of a first type into a first selected minislot of a selected frame of an uplink channel when information of a first type is to be sent, the uplink channel having a plurality of frames, each frame having a first selectable number of minislots and a second selectable number of slots, the reservation request of the first type requesting an assignment of at least one slot for transmitting information of the first type in at least one frame that is subsequent to the selected frame,
sending a reservation request of a second type into a second selected minislot of the selected frame when the second selected minislot is available in the selected frame and when information of a second type is to be sent, the reservation request of the second type requesting an assignment of at least one slot for transmitting information of the second type in at least one frame that is subsequent to the selected frame, the reservation request of the second type contending for the second selected minislot based on a blocked binary tree algorithm; and
receiving a feedback message from a downlink channel, the feedback message containing minislot assignment information for sending reservation requests of the first and the second type, slot assignment information for transmitting information of the first and the second type, minislot contention information for the reservation requests of the second type sent in the selected frame, and allocation time information for the reservation requests of the second type to be initiated in a frame after the selected frame on behalf of the information of the second type, the feedback message being received prior to an end of the selected frame of the uplink channel.

39. The method according to claim 38, wherein the reservation requests of the second type are sent into the second selected minislots, each second selected minislot being selected by a central station for a contention subgroup of terminals identified by a level in a virtual stack from a plurality of minislots available for sending the reservation requests of the second type that have experienced a collision not yet resolved.

40. The method according to claim 38, wherein the reservation requests of the second type are sent into the second selected minislots, each second selected minislot being selected independently and at random with equal probability from a plurality of minislots available for sending new reservation requests of the second type on behalf of the information of the second type arriving between an old allocation time and a new allocation time.

41. The method according to claim 39, wherein the reservation request of the second type is sent when a virtual stack level associated with the reservation request of the second type has a smaller value than the number of minislots available for sending reservation requests of the second type.

42. The multiple access communication protocol according to claim 40, wherein the reservation request of the second type is sent when the number of virtual stack levels associated with the reservation requests of the second type undergoing collision resolution is smaller than the number of minislots available for sending reservation requests of the second type.

43. The method according to claim 38, wherein the feedback message includes slot assignment information for at least one frame following the selected frame.

44. The method according to claim 38, wherein the feedback message includes information relating to a number of minislots available in a frame after the selected frame for sending reservation request of the second type, and information relating to a new allocation time for reservation requests of the second type to be initiated in a frame after the selected frame on behalf of information of the second type.

45. The method according to claim 38, wherein the minislot contention information includes information relating to a successful sending of the reservation requests of the second type.

46. The method according to claim 38, wherein the minislot contention information includes information relating to a collision of the reservation requests of the second type.

47. The method according to claim 38, further comprising a step of adjusting a virtual stack level value identifying a contention subgroup of terminals sending the reservation request of the second type based on the minislot contention information.

48. The method according to claim 47, wherein the step of adjusting the virtual stack level value includes a step of subtracting one from the virtual stack level value identifying the contention subgroup of terminals sending the reservation request of the second type for each noncolliding contention subgroup of terminals identified by a virtual stack level that is less than the virtual stack level associated with the reservation request of the second type.

49. The method according to claim 47, wherein the step of adjusting the virtual stack level value includes a step of adding one to the virtual stack level value identifying the contention subgroup of terminals sending the reservation request of the second type for each colliding contention subgroup of terminals identified by a virtual stack level that is less than the virtual stack level associated with the reservation request of the second type.

50. The method according to claim 38, wherein the information of the first type is a talkspurt of a voice message, and the information of the second type is a data message.

51. The method according to claim 38, wherein the information of the first type is transmitted in the uplink channel in a slot in a frame that is subsequent to the selected frame that is assigned in response to the reservation request of the first type.

52. The method according to claim 51, wherein an end indication message is sent in the slot in a frame that is subsequent to the selected frame that is assigned in response to the first reservation request when transmission of the information of the talkspurt is ending.

53. The method according to claim 52, further comprising a step of receiving a message from the downlink channel containing a minislot assignment in response to the end indication message.

54. The method according to claim 38, wherein the first selectable number of minislots and the second selectable number of slots are each predetermined.

55. The method according to claim 38, wherein the first selectable number of minislots and second selectable number of slots are each adjustable.

56. The method according to claim 38, wherein the uplink and downlink channels are part of a time division multiple access communication system.

57. The method according to claim 38, wherein the uplink and downlink channels are part of a frequency division multiple access communication system.

58. The method according to claim 38, wherein the uplink and downlink channels are part of a code division multiple access communication system.

59. The method according to claim 38, wherein the at least one slot assigned for transmitting information of the first type is assigned based on a contention-free reservation mechanism.

60. A system for providing multiple access to a communication channel, the system comprising:
a central station; and
a plurality of terminal units coupled to the central station through a communication channel, the communication channel including an uplink channel having a plurality of frames, each frame having a first selectable number of minislots and a second selectable number of slots, a first terminal unit sending a reservation request of a first type into a first selected minislot of a selected frame when the first terminal has information of a first type to be sent to the central station, the reservation request of the first type requesting for an assignment of at least one slot for transmitting information of the first type in at least one frame that is subsequent to the selected frame, and a second terminal unit sending a reservation request of a second type for a slot assignment into a second selected minislot of the selected frame when the second selected minislot is available in the selected frame and when the second terminal has information of a second type to be sent to the central station, the reservation request of the second type requesting for an assignment of at least one slot for transmitting information of the second type in at least one frame that is subsequent to the selected frame, the second terminal unit contending for the second selected minislot based on a blocked binary tree algorithm; and
the central station receiving the reservation request of the first type when the reservation request of the first type is sent into the first selected minislot and the reservation request of the second type when the reservation request of the second type is sent into the second selected minislot, and broadcasting a feedback message in a downlink channel prior to the end of the selected frame, the feedback message containing minislot assignment information for the first and the second terminal unit to send the reservation request of the first and the second type, slot assignment information for the first and the second terminal unit to send information of the first and the second type, minislot contention information the reservation requests of the second type received by the central station, and allocation time information for the reservation requests of the second type to be initiated by the second terminal units in a frame after the selected frame on behalf of the information of the second type,
the first terminal unit receiving the feedback message and transmitting the information of the first type based on the slot assignment information for the first terminal unit, and
the second terminal unit receiving the feedback message when the second terminal unit sends the reservation request of the second type into the second selected minislot, and determining from the minislot contention information whether the second terminal unit successfully contended for the second selected minislot.

61. The system according to claim 60, wherein the reservation requests of the second type are sent into the second selected minislots by the second terminal units, each second selected minislot being selected by a central station for a contention subgroup of terminals identified by a level in a virtual stack from a plurality of minislots available for sending the reservation requests of the second type that have experienced a collision not yet resolved.

62. The system according to claim 60, wherein the reservation requests of the second type are sent into the second selected minislots, each second selected minislot being selected independently and at random with equal probability from a plurality of minislots available for the second terminal units to send new reservation requests of the second type on behalf of the information of the second type arriving between an old allocation time and a new allocation time.

63. The system according to claim 60, wherein the reservation request of the second type is sent when a virtual stack level associated with the reservation request of the second type has a smaller value than the number of minislots available for sending reservation requests of the second type.

64. The system according to claim 60, wherein the reservation request of the second type is sent when the number of virtual stack levels associated with the reservation requests of the second type undergoing collision resolution is smaller than the number of minislots available for sending reservation requests of the second type.

65. The system according to claim 60, wherein the feedback message includes slot assignment information for at least one frame following the selected frame.

66. The system according to claim 60, wherein the feedback message includes information relating to a number of minislots available in a frame after the selected frame for sending reservation requests of the second type, and information relating to a new allocation time for reservation requests of the second type to be initiated in a frame after the selected frame on behalf of information of the second type.

67. The system according to claim 60, wherein the minislot contention information includes information relating to a successful sending of the reservation requests of the second type.

68. The system according to claim 60, wherein the minislot contention information includes information relating to a collision of the reservation requests of the second type.

69. The system according to claim 60, wherein the second terminal unit adjusts a virtual stack level value identifying a contention subgroup of the second terminal units based on the minislot contention information.

70. The system according to claim 69, wherein the second terminal unit adjusts the virtual stack level value by subtracting one from the virtual stack level value identifying the contention subgroup of the second terminal unit for each noncolliding contention subgroup of the second terminal units identified by a virtual stack level that is less than the virtual stack level associated with the second terminal unit.

71. The system according to claim 69, wherein the second terminal unit adjusts the virtual stack level value by adding one to the virtual stack level value identifying the contention subgroup of the second terminal unit for each noncolliding contention subgroup of the second terminal units identified by a virtual stack level that is less than the virtual stack level associated with the second terminal unit.

72. The system according to claim 60, wherein the information of the first type is a talkspurt of a voice message, and the information of the second type is a data message.

73. The system according to claim 60, wherein the first terminal unit sends the information of the first type in the uplink channel in at least one slot in at least one frame that is subsequent to the selected frame that was assigned in response to the reservation request of the first type.

74. The system according to claim 73, wherein the first terminal unit transmits an end indication message in a slot in a frame that is subsequent to the selected frame that was assigned in response to the reservation request of the first type when transmission of the information of the first type is ending.

75. The system according to claim 74, wherein the central station broadcasts a message having a minislot assignment in response to the end indication message.

76. The system according to claim 60, wherein the first selectable number of minislots and the second selectable number of slots are each predetermined.

77. The system according to claim 60, wherein the first selectable number of minislots and the second selectable number of slots are each adjustable.

78. The system according to claim 60, wherein the uplink and downlink channels are part of a time division multiple access communication system.

79. The system according to claim 60, wherein the uplink and downlink channels are part of a frequency division multiple access communication system.

80. The system according to claim 60, wherein the uplink and downlink channels are part of a code division multiple access communication system.

81. The system according to claim 60, wherein the at least one slot assigned for transmission of the information of the first type is assigned based on a contention-free reservation mechanism.

* * * * *